(12) United States Patent
Ng et al.

(10) Patent No.: US 10,506,302 B2
(45) Date of Patent: Dec. 10, 2019

(54) METHOD FOR SIGNALING OPAQUE USER DATA

(71) Applicant: Sharp Kabushiki Kaisha, Sakai, Osaka (JP)

(72) Inventors: Sheau Ng, Camas, WA (US); Kiran Mukesh Misra, Camas, WA (US); Sachin G. Deshpande, Camas, WA (US); Christopher Andrew Segall, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/158,329

(22) Filed: Oct. 12, 2018

(65) Prior Publication Data

US 2019/0200100 A1 Jun. 27, 2019

Related U.S. Application Data

(63) Continuation of application No. 16/080,045, filed as application No. PCT/JP2017/008100 on Mar. 1, 2017.

(60) Provisional application No. 62/302,133, filed on Mar. 1, 2016, provisional application No. 62/333,683, filed on May 9, 2016, provisional application No. 62/353,617, filed on Jun. 23, 2016, provisional application No. 62/400,603, filed on Sep. 27, 2016, provisional application No. 62/408,614, filed on Oct. 14, 2016.

(51) Int. Cl.
*H04N 21/8358* (2011.01)
*H04N 21/44* (2011.01)
*H04N 21/4722* (2011.01)
*H04N 21/658* (2011.01)
*H04N 21/435* (2011.01)
*H04N 21/81* (2011.01)

(52) U.S. Cl.
CPC ..... *H04N 21/8358* (2013.01); *H04N 21/4351* (2013.01); *H04N 21/44008* (2013.01); *H04N 21/4722* (2013.01); *H04N 21/6581* (2013.01); *H04N 21/814* (2013.01)

(58) Field of Classification Search
CPC .......... H04N 21/8358; H04N 21/4351; H04N 21/44008; H04N 21/4722; H04N 21/6581; H04N 21/814
See application file for complete search history.

(56) References Cited

PUBLICATIONS

Ng et al., "Systems and Methods for Signaling Resource Identifiers Using Watermarks", U.S. Appl. No. 16/080,045, filed Aug. 27, 2018.

*Primary Examiner* — Michael E Teitelbaum
(74) *Attorney, Agent, or Firm* — Keating & Bennett, LLP

(57) ABSTRACT

A device may be configured to signal information using watermarks. A device may be configured to determine an identifier associated with an address of a resource associated with multimedia content and embed the identifier in a signal representing multimedia content. A device may be configured to receive a multimedia signal, parse an identifier associated with an address of a resource from the multimedia signal, generate a query including the identifier, and receive supplemental content in response to the query.

4 Claims, 6 Drawing Sheets

METHOD FOR SIGNALING OPAQUE USER DATA

CROSS REFERENCE

This Nonprovisional application claims priority under 35 U.S.C. § 119 on provisional Application No. 62/302,133 on Mar. 1, 2016, and provisional Application No. 62/333,683 on May 9, 2016, and provisional Application No. 62/353,617 on Jun. 23, 2016, and provisional Application No. 62/400,603 on Sep. 27, 2016, and provisional Application No. 62/408,614 on Oct. 14, 2016, the entire contents of which are hereby incorporated by reference.

TECHNICAL FIELD

The present disclosure relates to the field of interactive television.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and/or audio programming, and application based enhancements) may originate and/or be distributed from a plurality of sources including, for example, over-the-air television providers or broadcasters, satellite television providers, cable television providers, online media service providers, including, so-called streaming service providers, and the like. Digital media content may be delivered over packet-switched networks, including bidirectional networks, such as Internet Protocol (IP) networks, and unidirectional networks, such as digital broadcast networks.

Digital media content may be transmitted from a source to a receiver device (e.g., a digital television or a smart phone) according to a transmission standard. Examples of transmission standards include Digital Video Broadcasting (DVB) standards, Integrated Services Digital Broadcasting Standards (ISDB) standards, and standards developed by the Advanced Television Systems Committee (ATSC), including, for example, the ATSC 2.0 standard. The ATSC is currently developing the so-called ATSC 3.0 suite of standards. Transmission standards may define mechanisms for encapsulating digital media content for transmission and may define mechanisms for signaling information associated with digital media content. Current techniques for signaling information associated with digital media content may be less than ideal.

SUMMARY OF INVENTION

In general, this disclosure describes techniques for signaling resource identifiers. In particular, this disclosure describes example techniques for signaling resource identifiers using watermarks. The techniques described herein may be used to increase security when resource identifiers are signaled using watermarks. The techniques described herein may be particularly useful for redistribution of a multimedia presentation. It should be noted that although in some examples the techniques of this disclosure are described with respect to ATSC standards, including those currently under development, the techniques described herein are generally applicable to any transmission standard. For example, the techniques described herein are generally applicable to any of DVB standards, ISDB standards, ATSC Standards, Digital Terrestrial Multimedia Broadcast (DTMB) standards, Digital Multimedia Broadcast (DMB) standards, Hybrid Broadcast and Broadband Television (HbbTV) standards, and other video encoding standards. Further, it should be noted that incorporation by reference of documents herein is for descriptive purposes and should not be constructed to limit and/or create ambiguity with respect to terms used herein. For example, in the case where one incorporated reference provides a different definition of a term than another incorporated reference and/or as the term is used herein, the term should be interpreted in a manner that broadly includes each respective definition and/or in a manner that includes each of the particular definitions in the alternative.

An aspect of the invention is a method for requesting supplemental content, the method comprising: receiving a multimedia signal; extracting a watermark message from the multimedia signal; parsing a syntax element indicating a portion of an authority component from the watermark message; parsing a syntax element indicating a path component from the watermark message; and constructing a request for supplemental content by forming a resource identifier including the portion of the authority component and the path component.

An aspect of the invention is a device comprising one or more processors configured to: extract a watermark message from the multimedia signal; parse a syntax element indicating a portion of an authority component from the watermark message; parse a syntax element indicating a path component from the watermark message; and construct a request for supplemental content by forming a resource identifier including the portion of the authority component and the path component.

An aspect of the invention is A method for signaling opaque user data in a payload of a watermark message, the method comprising: determining a number of data fragments required for the information; signaling a syntax element identifying a message block type based on the number of data fragments required for the information; and signaling a syntax element indicating the length of the message block payload, wherein the number of bits of the syntax element indicating the length of the message block payload is based on the message block type.

DESCRIPTION OF EMBODIMENTS

Figure 1:
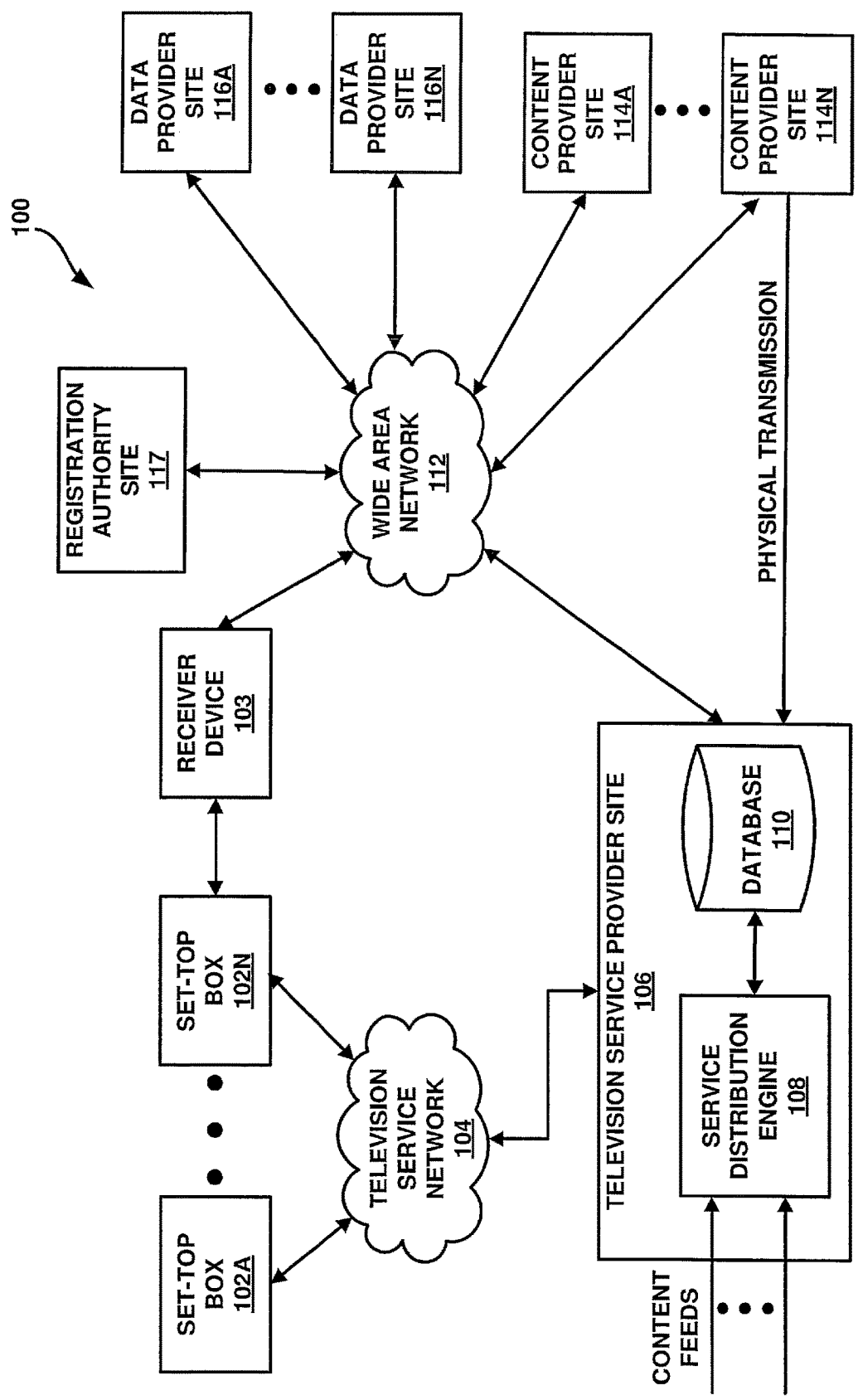
FIG. 1 is a block diagram illustrating an example of a system that may implement one or more techniques of this disclosure.

Computing devices and/or transmission systems may be based on models including one or more abstraction layers, where data at each abstraction layer is represented according to particular structures, e.g., packet structures, modulation schemes, etc. The Open Systems Interconnection (OSI) model defines a 7-layer stack model, including an application layer, a presentation layer, a session layer, a transport layer, a network layer, a data link layer, and a physical layer. It should be noted that the use of the terms upper and lower with respect to describing the layers in a stack model (e.g., a content delivery protocol model) may be based on the application layer being the uppermost layer and the physical layer being the lowermost layer. Further, in some cases, the term "Layer 1" or "L1" may be used to refer to a physical layer, the term "Layer 2" or "L2" may be used to refer to a link layer, and the term "Layer 3" or "L3" or "IP layer" may be used to refer to the network layer. A physical layer may generally refer to a layer at which electrical signals form digital data. For example, a physical layer may refer to a layer that defines how modulated radio frequency (RF) symbols form a frame of digital data. A data link layer, which may also be referred to as link layer, may refer to an abstraction used prior to physical layer processing at a sending side and after physical layer reception at a receiving side. It should be noted that a sending side and a receiving side are logical roles and a single device may operate as both a sending side in one instance and as a receiving side in another instance. A network layer may generally refer to a layer at which logical addressing occurs. That is, a network layer may generally provide addressing information (e.g., Internet Protocol (IP) addresses) such that data packets can be delivered to a particular node (e.g., a computing device) within a network. Each of a transport layer, a session layer, a presentation layer, and an application layer may define how data is delivered for use by a user application.

With respect to digital media content, watermarking may generally refer to a process of embedding information into a video and/or audio signal. That is, in some examples, watermarking may enable supplemental data to be extracted from higher layer signals (e.g., from signals enabling the presentation or rendering of multimedia data). Watermarks may be useful in redistribution scenarios. An example of a redistribution scenario may include a situation where a device receives a multimedia signal (e.g., a video and/or audio signal) and recovers embedded information from the multimedia signal. For example, a receiver device (e.g., a digital television) may receive an uncompressed video signal from a multimedia interface (e.g., a High Definition Multimedia Interface (HDMI), or the like) and the receiver device may recover embedded information from the uncompressed video signal. In some cases, a redistribution scenario may occur when a so-call Multi-channel Video Program Distributor (MVPD) (e.g., a cable television service operator, a satellite television service operator, an Internet Protocol Television (IPTV) service operator, or the like) acts as an intermediary between a receiver device and a content provider (e.g., a local network affiliate). In these cases, a set-top box may receive a multimedia service data stream through particular physical, link, and/or network layers and output an uncompressed multimedia signal to a receiver device. Thus, in redistribution scenarios, a receiver device may receive multimedia signals without accessing lower layers of a content delivery protocol model. It should be noted that in some examples, a redistribution scenario may include a situation where a set-top box or a home media server acts as in-home video distributor and serves data (e.g., through a local wired or wireless network) to connected devices (e.g., smartphones, tablets, etc.).

Watermarking may be useful to ensure that a receiver device can retrieve supplementary content (e.g., emergency messages, alternative audio tracks, application data, closed captioning data, etc.) regardless of how multimedia content is distributed. In some cases, a content provider may want to ensure that supplemental content is available at the time content is rendered to a viewer. For example, a local network affiliate may embed a watermark in a video signal to ensure that a receiver device can retrieve supplemental information associated with a local television presentation (e.g., a local news broadcast) and thus, present supplemental content to a viewer. Further, in some cases, an MVPD may embed a watermark in a video signal to enhance content originating from a content provider (e.g., provide a targeted supplemental advertisement).

It should be noted that as used herein the term receiver device may refer to a device capable of receiving video and/or audio signals and causing visual and auditory data to be rendered from the received signals (e.g., a digital television receiving an uncompressed multimedia signal). Further, the term set-top box may refer to a device configured to receive a multimedia service data stream (e.g., an over-the-air broadcast, a cable television service, a satellite television service, a so-call over the top (OTT) television service, etc.) and output video and/or audio signals that may be rendered for presentation by a receiver device. It should be noted that such example definitions of a receiver device and a set-top box should not be constructed to limit the scope of the techniques described herein. For example, a single device may be configured to perform the functions of a set-top box and a receiving device. That is, for example, a digital television may be configured to receive a multimedia service data stream and perform lower layer processing to extract uncompressed multimedia signals and render multimedia content therefrom. Further, the techniques described herein may be generally applicable to watermarks regardless of how multimedia content is described. For example, the techniques described herein may be applicable to watermarks included in multimedia content distributed using a physical medium (e.g., an optical disk).

In some examples, a watermark may signal a resource identifier. As used herein, a resource identifier may include a URI, URL, a Universal Resource Name (URN), combination thereof, and/or components thereof. As described in Request for Comments (RFC) 3986 IETF: "Uniform Resource Identifiers (URI): Generic Syntax," RFC 3986, January, 2005, which is incorporated by reference in its entirety, a URI may generally be described as having component parts arranged according to the following format:

scheme://authority/path

In the example above, a scheme component may include a defined scheme (e.g., HTTP, HTTP Secure (HTTPS), File Transfer Protocol (FTP), etc.), an authority component may include a host, including, for example, a host identified by a registered name (e.g., a Domain Name), and a path component may include a sequence of path segments to identify a particular resource.

Transmission standards, including transmission standards currently under development, may specify watermark emission protocols from which compliant devices may extract data therefrom and types of data that may be extracted therefrom. Aspects of the ATSC 3.0 suite of standards currently under development are described in Candidate Standards, which may include proposed aspects for inclusion in a published (i.e., "final" or "adopted") version of an ATSC 3.0 standard. ATSC Candidate Standard: Video Watermark Emission (A/335), Doc. 533-156r1, 30 Nov. 2015 (hereinafter "A/335"), which is incorporated by reference in its entirety, describes specific proposed aspects of an emission format for video watermarks for use within ATSC 3.0 systems. ATSC Candidate Standard: Audio Watermark Emission (A/334), Doc. 533-160r4, 19 Aug. 2016 (hereinafter "A/334"), which is incorporated by reference in its entirety, describes specific proposed aspects of an emission format for audio watermarks for use within ATSC 3.0 systems. Further, ATSC Candidate Standard: Content Recovery (A/336), Doc. 533-178r2, 15 Jan. 2016, and its subsequent revisions, including Doc. 533-3-327r7, 12 Sep. 2016 (hereinafter collectively referred to as "A/336"), which is incorporated by reference in its entirety, specifies how certain signaling information can be carried in audio watermark payloads, video watermark payloads, and the user areas of audio tracks, and how this information can be used to access supplementary content in a redistribution scenario.

According to A/335, a video watermark may embed a data signal into luma values of the top lines of a video frame. It should be noted that the top lines of a video frame are not typically displayed and as such, in this case, the watermark may be imperceptible to a viewer. A/336 describes where a video watermark payload may include one or more types of messages. Table 1 provides the syntax for a message included in a video watermark payload as provided in Doc. S33-178r2, 15 Jan. 2016 of A/336 (hereinafter "A/336r2").

TABLE 1

| Syntax | No. of Bits | Format |
|---|---|---|
| wm_message_block( ) { | | |
|   wm_message_id | 8 | uimsbf |
|   wm_message_block_length | 8 | uimsbf |
|   wm_message_version | 4 | uimsbf |
|   fragment_number | 2 | uimsbf |
|   last_fragment | 2 | uimsbf |
|   wm_message_bytes( ) | var | |
|   if ((fragment_number == last_fragment) | | |
|     && (fragment_number != 0)) { | | |
|     message_CRC_32 | 32 | uimsbf |
|   } | | |
|   CRC_32 | 32 | uimsbf |
| } | | |

A/336r2 provides the following definitions for respective syntax elements wm_message_id, wm_message_block_length, wm_message_version, fragment_number, last_fragment, wm_message_bytes( ) message_CRC_32, and CRC_32. It should be noted that in Table 1 and other tables included in this disclosure uimsbf may refer to an unsigned integer, transmitted most significant bit first. Further, it should be noted that in some examples, wm_message_id, wm_message_block_length, wm_message_version, fragment_number, and last_fragment may be referred to as forming a header of a watermark message and wm_message_bytes( ) may be referred to as an instance of a watermark message.

wm_message_id—This 8-bit value shall uniquely identify the syntax and semantics of the data bytes carried in the message block, coded according to Table [2] below . . .

TABLE 2

| wm_message_id Value | wm_message( ) | Reference |
|---|---|---|
| 0x00 | reserved | |
| 0x01 | content_id_message( ) | Sec. 5.1.4 [of A/336r2] |
| 0x02 | presentation_time_message( ) | Sec. 5.1.5 [of A/336r2] |
| 0x03 | uri_message( ) | [Table 6] |
| 0x04 | vp1_message( ) | Sec. 5.1.7 [of A/336r2] |
| 0x05 | dynamic_event_message( ) | Sec. 5.1.8 [of A/336r2] |
| 0x06 | emergency_alert_message( ) | [Table 8] |
| 0x07 | display_override_message( ) | Sec. 5.1.10 [of A/336r2] |
| 0x08-0x7F | reserved | |
| 0x80-0xFF | user private | | wm_message_block_length—This 8-bit value shall specify the number of remaining bytes in the wm_message_block( ) that immediately follows this field up to and including the CRC_32_field.

wm_message_version—This 4-bit value shall be incremented if and only if anything in the wm_message( ) changes, with wrap-around to 0 after the value reaches 15. The watermark processor in the receiving device is expected to use wm_message_version to discard duplicates. The video signal may include repeated instances of the same wm_message( ) to improve reliability of delivery.

fragment_number—This 2-bit value shall specify the number of the current message fragment minus one. For example, value of '00' in fragment_number indicates the wm_message_block( ) carries the first (or only) fragment of a message, a fragment_number value of '01' indicates the wm_message_block( ) carries the second fragment of a message, etc. The value of fragment_number shall be less than or equal to the value of last_fragment.

last_fragment—This 2-bit value shall specify the fragment number of the last fragment used to deliver the complete wm_message( ). A value of '00' in last_fragment indicates no fragmentation is used (the wm_message( ) contained within is complete). A value of '01' in last_fragment indicates the wm_message( ) will be delivered in two parts, a value of '10' indicates the wm_message( ) will be delivered in three parts, and a value of '11' indicates it will be delivered in four parts. The pair of values fragment_number and last_fragment may be considered to signal "part M of N."

wm_message_bytes( )—When the value of last_fragment is 0, wm_message_bytes( ) shall be a complete instance of the watermark message identified by the value of wm_message_id. When the value of last_fragment is non-zero, wm_message_bytes( ) shall be a fragment of that watermark message, where each fragment is constructed according to the rules given in Section 5.1.2 [of A/336r2]. The concatenation of all instances of wm_message_block( ) with a given wm_message_id and wm_message_fragment_version number shall result in the complete wm_message( ) associated with that wm_message_id.

message_CRC_32—When a message is sent in two or more fragments (e.g. last_fragment>0) a 32-bit [Cyclic redundancy check (CRC)] covering the complete message (before fragmentation) shall be provided in the last fragment of a fragmented message. The message_CRC_32 field shall not be present for non-fragmented messages (e.g. when the value of last_fragment is 0) or in any fragment other than the last (e.g. when fragment_number≠last_fragment). The message_CRC_32, when present, shall contain the CRC value that gives a zero output of the registers in the decoder defined in ISO/IEC 13818-1 [ISO: "ISO/IEC IS 13818-1 (2013) (E), International Standard, Information technology—Generic coding of moving pictures and associated audio information: systems," which is incorporated by reference in its entirety], Annex A after processing the entire re-assembled message payload. The generating polynomial is $1+x+x^2+x^4+x^5+x^7+x^8+x^{10}+x^{11}+x^{12}+x^{16}+x^{22}+x^{23}+x^{26}$.

CRC_32—This 32-bit field shall contain the CRC value that gives a zero output of the registers in the decoder defined in ISO/IEC 13818-1, Annex A after processing the entire message block. The generating polynomial is $1+x+x^2+x^4+x^5+x^7+x^8+x^{10}+x^{11}+x^{12}+x^{16}+x^{22}+x^{23}+x^{26}$.

Table 3 provides the syntax for a message included in a video watermark payload as provided in Doc. 533-3-327r7, Sep. 12, 2016 of A/336 (hereinafter "A/336r7").

TABLE 3

| Syntax | No. of Bits | Format |
|---|---|---|
| wm_message_block( ) { | | |
|     wm_message_id | 8 | uimsbf |
|     wm_message_block_length | 8 | uimsbf |
|     wm_message_version | 4 | uimsbf |
|     if ((wm_message_id & 0x40)==0) { | | |
|         fragment_number | 2 | uimsbf |
|         last_fragment | 2 | uimsbf |
|     } else { | | |
|         reserved | 4 | '1111' |
|         fragment_number | 8 | uimsbf |
|         last_fragment | 8 | uimsbf |
|     } | | |
|     wm_message_bytes( ) | var | |
|     if ((fragment_number == last_fragment) && (fragment_number != 0)) { | | |
|         message_CRC_32 | 32 | uimsbf |
|     } | | |
|     CRC_32 | 32 | uimsbf |
| } | | |

In A/336r7, the definitions for respective syntax elements wm_message_block_length and wm_message_version are similar to those provided above with respect to Table 1. A/336r7 provides the following definitions for respective syntax elements wm_message_id, fragment_number, last_fragment, wm_message_bytes( ) message_CRC_32, and CRC_32.

wm_message_id—This 8-bit value shall uniquely identify the syntax and semantics of the data bytes carried in the message block, coded according to Table [4] below.

TABLE 4

| wm_message_id Value | Max Fragments | wm_message( ) | Reference |
|---|---|---|---|
| 0x00 | 4 | reserved | |
| 0x01 | | content_id_message( ) | Sec. 5.1.4 [of A/336r7] |
| 0x02 | | presentation_time_message( ) | Sec. 5.1.5 [of A/336r7] |
| 0x03 | | uri_message( ) | [Table 6] |
| 0x04 | | vp1_ message( ) | Sec. 5.1.7 [of A/336r7] |
| 0x05 | | dynamic_event_message( ) | Sec. 5.1.8 [of A/336r7] |
| 0x06 | | emergency_alert_message( ) | [Table 8] |
| 0x07 | | display_override_message( ) | Sec. 5.1.10 [of A/336r7] |
| 0x08-0x3F | | reserved | |
| 0x40 | 256 | full_emergency_alert_message( ) | Sec. 5.1.11 [of A/336r7] |
| 0x41-0x7F | | reserved | |
| 0x80-0xBF | 4 | user private | |
| 0xC0-0xFF | 256 | | | fragment_number—This 2-bit or 8-bit value shall specify the number of the current message fragment minus one. When (wm_message_id & 0x40)==0), i.e., bit 6 is value '0', then fragment_number shall be 2 bits in length. When (wm_message_id & 0x40)==1), i.e., bit 6 is value '1', then fragment_number shall be 8 bits in length. For example, value of 0 in fragment_number indicates the wm_message_block( ) carries the first (or only) fragment of a message, a fragment_number value of 1 indicates the wm_message_block( ) carries the second fragment of a message, etc. The value of fragment_number shall be less than or equal to the value of last_fragment.

last_fragment—This 2-bit or 8-bit value shall specify the fragment number of the last fragment used to deliver the complete watermark message. When (wm_message_id & 0x40)==0), i.e., bit 6 is value '0', then last_fragment shall be 2 bits in length. When (wm_message_id & 0x40)==1), i.e., bit 6 is value '1', then last_fragment shall be 8 bits in length. A value of zero in last_fragment indicates no segmentation is used (the watermark message contained within is complete). A value of 1 in last_fragment indicates the wm_message( ) will be delivered in two parts, a value of 2 indicates the watermark message will be delivered in three parts, and a value of 3 indicates it will be delivered in four parts, etc. The pair of values fragment_number and last_fragment may be considered to signal "part M of N."

wm_message_bytes( )—When the value of last_fragment is 0, wm_message_bytes( ) shall be a complete instance of the watermark message identified by the value of wm_message_id. When the value of last_fragment is non-zero, wm_message_bytes( ) shall be a fragment of that watermark message. The concatenation of all instances of wm_message_block( ) with a given wm_message_id and wm_message_fragment_version number shall result in the complete watermark message associated with that wm_message_id.

message_CRC_32—When a message is sent in two or more fragments (e.g. last_fragment>0) a 32-bit CRC covering the complete message (before segmentation) shall be provided in the last fragment of a fragmented message. The message_CRC_32 field shall not be present for non-fragmented messages (e.g. when the value of last_fragment is 0) or in any fragment other than the last (e.g. when fragment_number≠last_fragment). The message_CRC_32, when present, shall contain the CRC value that gives a zero output of the registers in the decoder defined in ISO/IEC 13818-1, Annex A after processing the entire re-assembled message payload formed by con-catenating the wm_message_id and wm_message_bytes(i) as specified in Table [5] The generating polynomial shall be $1+x+x^2+x^4+x^5+x^7+x^8+x^{10}+x^{11}+x^{12}x^{16}+x^{22}+x^{23}+x^{26}$.

TABLE 5

| Syntax | No. of Bits | Format |
| --- | --- | --- |
| wm_message( ) { | | |
|     wm_message_id | 8 | uimsbf |
|     for i=0; i<=last_fragment; i++) { | | |
|         wm_message_bytes(i) | var | Table [4] |
|     } | | |
|     message_CRC_32 | 32 | uimsbf |
| } | | |

With respect to Table 5, the wm_message_block( ) can deliver fragments of watermark messages that are intended to be reassembled before being processed further. The wm_message( ) data structure specified in Table 5 below represents the re-assembled fragments. The definitions of wm_message_id, last_fragment, and message_CRC_32 in Table 5 shall be as specified above for wm_message_block( ). The wm_message_bytes(i) field shall represent the wm_message_bytes( ) contained in the ith fragment of the message (counting from zero).

CRC_32—This 32-bit field shall contain the CRC value that gives a zero output of the registers in the decoder defined in ISO/IEC 13818-1, Annex A after processing the entire message block. The generating polynomial shall be $1+x+x^2+x^4+x^5+x^7+x^8+x^{10}+x^{11}+x^{12}+x^{16}+x^{22}+x^{23}+x^{26}$.

Referring to Tables 1-2 and Tables 3-4, A/336 describes where a video watermark payload may include uri_message( ). A uri_message( ) may refer to a Universal Resource Indentifier (URI) message and may be used to deliver URIs of various types. Table 6 provides the syntax of a uri_message( ) as provided in A/336.

TABLE 6

| Syntax | No. of Bits | Format |
| --- | --- | --- |
| uri_message( ) { | | |
|     uri_type | 8 | uimsbf |
|     uri_strlen | 8 | uimsbf |
|     URI_string( ) | 8*uri_strlen | |
| } | | |

A/336 provides the following definitions for syntax elements uri_type, uri_strlen, and URI_string( ).

uri_type—An 8-bit unsigned integer field that shall identify the type of URI to follow, according to the encoding given in Table [7].

TABLE 7

| uri_type value | Meaning |
| --- | --- |
| 0x00 | Reserved |
| 0x01 | Signaling server (providing access to the Service Layer Signaling (SLS) . . .). |
| 0x02 | ESG (Electronic Service Guide) data server (providing access to the ESG data . . .). |
| 0x03 | URL of Service Usage Data Gathering Report server (for use in reporting service usage . . .). |
| 0x04-0xFF | Reserved | uri_strlen—An 8-bit unsigned integer that shall signal the number of characters in the uri_string( ) to follow. The value of the uri_strlen field shall be less than or equal to [86 in A/336r2 and 78 in A/336r7] for 1X video watermark emission format (1X System) and shall be less than or equal to [206 in A/336r2 and 198 in A/336r7] for 2X video watermark emission format (2X System) [as provided in A/335].

URI_string( )—A URI consisting of characters whose values shall be restricted to those allowed for Uniform Resource Identifiers (URIs) by RFC 3986. The length of the string shall be as given by the value of uri_strlen. The character string, after re-assembly if the URI is sent in fragments, shall be a valid URI per RFC 3986.

It should be noted with respect to Table 6 that URI_string( ) may include any valid URI as provided in RFC 3986, as such, may include a complete Universal Resource Locator (URL) and is not restricted with respect to possbile values of an authority component. The authority component of a URI is described in further detail below.

Referring to Tables 1-2 and Tables 3-4, A/336 describes where a video watermark payload may include emergency_alert_message( ). An emergency_alert_message( ) supports delivery of emergency alert information in video watermarks. Table 8 provides the syntax of an emergency_alert_message( ) as provided in A/336.

TABLE 8

| Syntax | No. of Bits | Format |
| --- | --- | --- |
| emergency_alert_message( ) { | | |
|     CAP_message_ID_length (N1) | 8 | uimsbf |
|     CAP_message_ID | 8*(N1) | |
|     CAP_message_url_length (N2) | 8 | uimsbf |
|     CAP_message_url | 8*(N2) | |
|     Expires | 32 | uimsbf |
|     Urgency | 1 | bslbf |
|     severity_certainty | 4 | bslbf |
|     Reserved | 3 | "111" |
| } | | |

A/336 provides the following definitions for respective syntax elements CAP_message_ID_length, CAP_message_ID, CAP_message_url_length, CAP_message_url, expires, urgency, severity_certainty. It should be noted that in Table 8 and other tables included bslbf may refer to bit string, left bit first.

CAP_message_ID_length—This 8-bit unsigned integer field gives the length of the CAP_message_ID field in bytes.

CAP_message_ID—This string shall give the ID of the CAP message defined in [OASIS: "Common Alerting Protocol" Version 1.2, 1 Jul. 2010, which is incorporated by reference herein]. It shall be the value of the cap.alert.identifier element of the [Common Alerting Protocol (CAP)] message indicated by CAP_message_url.

CAP_message_url_length—This 8-bit unsigned integer field gives the length of the CAP_message_url field in bytes.

CAP_message_url—This string shall give the URL that can be used to retrieve the CAP message.

expires—This parameter shall indicate the latest expiration date and time of any <info> element in the CAP message, encoded as a 32-bit count of the number of seconds since Jan. 1, 1970 00:00:00, International Atomic Time (TAI).

urgency—When set to '1', this flag shall indicate that the urgency of the most urgent <info> element in the CAP message is "Immediate." When set to '0', it shall indicate otherwise.

severity_certainty—This is a 4-bit field code that is derived from the values of the required CAP elements of certainty and severity . . . .

It should be noted with respect to Table 8 that CAP_message_url is not restricted to particular authorities. As described above, with respect to Table 6, URI_string( ) is also not restricted to particular authorities. As described in further detail below, enabling a URI that is not restricted, with respect to potential values, including potential authorities, to be signaled in a watermark may pose a security risk to a receiver device.

According to A/334, an audio watermark may embed a data signal into a Linear Pulse Code Modulation (PCM) audio signal. It should be noted that the audio watermark is imperceptible to a viewer. A/336 describes where an audio watermark payload may include one or more types of messages. Table 9 provides the syntax for a message included in an audio watermark payload as provided in A/336r7. As illustrated in Table 9, the syntax for small_domain( ) is provided in Table 10 and the syntax for large_domain( ) is provided in Table 11.

TABLE 9

| Syntax | No. of Bits | Format |
|---|---|---|
| vp1_payload( ) { | | |
|   domain_type | 1 | bslbf |
|   If (domain_type == 0) { | | |
|     small_domain( ) | var | Table 10 |
|   } | | |
|   else { | | |
|     large_domain( ) | var | Table 11 |
|   } | | |
| } | | |

TABLE 10

| Syntax | No. of Bits | Format |
|---|---|---|
| small_domain( ) { | | |
|   server_field | 31 | uimsbf |
|   interval_field | 17 | uimsbf |
|   query_flag | 1 | bslbf |
| } | | |

TABLE 11

| Syntax | No. of Bits | Format |
|---|---|---|
| large_domain( ) { | | |
|   server_field | 23 | uimsbf |
|   interval_field | 25 | uimsbf |
|   query_flag | 1 | bslbf |
| } | | |

A/336r7 provides the following definitions for respective syntax elements domain_type, server_field, interval_field, and query_field:

domain_type—This 1-bit value specifies whether the payload information is for a small_domain( ) or a large_domain( ).

server_field—This field contains the Server Code. The server code value shall be set in accordance with an assignment issued by a registration authority designated by ATSC.

interval_field—This field contains the Interval Code.

query_flag—This field signals when a Dynamic Event is available. A change in the value of this field between successive VP1 Payloads in a VP1 Audio Watermark Segment or between successive VP1 Message Groups in a VP1 Video Watermark Segment indicates that a Dynamic Event (as defined in A/337 [ATSC: "Application Signaling and Triggers," Document A/337, Advanced Television Systems Committee, 533-3-27r3-WD-App-Signaling, which is incorporated by reference]) is available from the Dynamic Event HTTP server.

Table 12 provides a range of the Server Code and the Interval Code as a function of domain type.

TABLE 12

| Domain Type | Server Code Range (hexadecimal) | Interval Code Range (hexadecimal) |
|---|---|---|
| Small Domain | 00000000-7FFFFFFF | 00000000-0001FFFF |
| Large Domain | 00000000-007FFFFF | 00000000-01FFFFFF |

Referring to Table 2 and Tables 4, A/336 describes where a video watermark payload may include vp1_message( ). A vp1_message( ) included in a video watermark payload may be based on the syntax provided in Table 9. Thus, in A/336 each of an audio watermark and a video watermark may signal a domain using vp1_payloads( ). A domain may include a resource identifier, as described above. As further described above, a redistribution scenario may include a situation where a receiver device receives a multimedia signal and recovers embedded information from the multimedia signal. In some examples, URIs embedded in a watermark may cause a receiver device to connect to server(s) to download additional data, such as, service-related tables. In some instances, such tables, may in turn instruct receivers to retrieve additional data and/or applications from the Internet. A recovery process may refer to a process that a receiver device in a redistribution scenario goes through to access to supplementary content using a watermark. For example, a recovery process may include a process a smart television uses to download a document using a URL signaled in a watermark.

A/336 describes where a data request can be made to a file server via issuance of a HTTP GET or HTTPS GET request for a file including signaling data about the service being presented. This file may be referred to as a recovery file and may include URLs that can be used to access signaling information for supplementary signaling and content. According to A/336, a recovery file shall be a JavaScript Object Notation (JSON) document. For the sake of brevity, the normative JSON schema for the A/336 recovery file format is not provided herein, however, reference is made to Annex B in A/336. It should be noted that in A/336 that each VP1 payload corresponds to one and only one recovery file including signaling data.

According to A/336, when a receiver device is receiving VP1 messages in audio watermarks or video watermarks, a URL corresponding to a recovery file shall be constructed from a VP1 payload using the following URL template:

http[s]://{hostName}/a336/rdt/{subdName}/{serverCode}-{intervalCode}.rdt where, items in square brackets [..] indicate an optional string; and items in curly brackets {..} indicate a named element;

the request shall use the prefix http when the query is employing HTTP; and

The request shall use the prefix https when the query is employing HTTPS.

Further, according to A/336,

---

If the domain_type of the VP1 payload is '0', then:
    hostName element shall have the value:
        a336.{serverCode1}.{serverCode2}.{serverCode3}.{serverCode4}.0.vp1.tv;
    subName element shall have the value:
        {serverCode4}{serverCode3}/{serverCode2}/{serverCode1}; and
    serverCode element shall have the value:
        {serverCode4}{serverCode3}{serverCode2}{serverCode1};
and if the domain_type of the VP1 watermark code is '1', then:
    hostName element shall have the value:
        a336.{serverCode1}.{serverCode2}.{serverCode3}.1.vp1.tv;
    subName element shall have the value:
        {serverCode3}{serverCode2}/{serverCode1}; and
    serverCode element shall have the value:
        {serverCode3}{serverCode2}{serverCode1}
        where serverCode1, serverCode2, serverCode3, and serverCode4 shall respectively mean the least-to-most significant bytes of the server_field of the VP1 payload (zero-padded at the most-significant bit to the next byte boundary) expressed as two-character uppercase-only hexadecimal values.

---

According to A/336, intervalCode element shall be the value of the interval_field of the VP1 payload (zero-padded at the most-significant bit to the next byte boundary) expressed as an uppercase-only hexadecimal value (6 characters in length for VP1 payloads with domain_type=0 and 8 characters in length for VP1 payloads with domain_type=1). Further, A/336 provides where the DNS resolution of {hostName} to the unspecified IP address (0.0.0.0/32 in the case of an IPv4 address or ::/128 in the case of an IPv6 address) shall indicate that the recovery protocol is not supported for the code domain and where recovery file requests should not be issued to the unspecified address. Thus, VP1 payloads may signal resource identifiers.

Thus, in A/336, for a Small Domain a URL corresponding to a recovery file having a server code value of 07ABCDEF and an interval code of 0001ABCD may be constructed as follows:
    http[s]://a336.EF.CD.AB.07.0.vp1.tv/a336/rdt/07AB/CD/EF/07ABCDEF-01ABCD.rdt
and for a Large Domain, a URL corresponding to a recovery file having a server code value of 07ABCD and an interval code of 01ABCDEF may be constructed as follows:
    http[s]://a336.CD.AB.07.1.vp1.tv/a336/rdt/07AB/CD/07ABCD-01ABCDEF.rdt As described above, in some cases, a receiver device may process a watermark independent of a particular source of a multimedia signal. For example, a receiver device may extract a watermark from any video signals received through an HDMI input regardless of whether the watermark is generated in a legitimate manner (e.g., from a content provider) or generated in an unintended or even malicious manner. As described above, URIs embedded in a watermark may cause a receiver device to connect to server(s) to download additional data, such as, service-related tables. In some instances, such tables, may in turn instruct receivers to retrieve additional data and/or applications from the Internet. Thus, a maliciously generated watermark may cause a receiver device to download malicious applications (e.g., viruses, spyware, etc.). The techniques described herein may be used to increase security with respect to URIs that receiver device accesses through watermark.

It should be noted that although the techniques described herein are described in the examples herein with respect to watermarks generated according to ATSC Candidate Standards, the techniques described herein are generally applicable to watermarks including information associated with a resource identifier. As described in further detail below, the techniques described herein may be used to provide content providers flexibility in forming messages that may be used to provide access supplemental content and may further enable critical messages to be securely carried using watermark channel in a redistribution scenario.

FIG. 1 is a block diagram illustrating an example of a system that may implement one or more techniques described in this disclosure. System 100 may be configured to communicate data in accordance with the techniques described herein. In the example illustrated in FIG. 1, system 100 includes one or more set-top boxes 102A-102N, television service network 104, television service provider site 106, wide area network 112, one or more content provider sites 114A-114N, one or more data provider sites 116A-116N, and registration authority site 117. Further, as illustrated in FIG. 1, respective receiver devices 103 (only one is shown) may be in communication with one of the one or more set-top boxes. System 100 may include software modules. Software modules may be stored in a memory and executed by a processor. System 100 may include one or more processors and a plurality of internal and/or external memory devices. Examples of memory devices include file servers, file transfer protocol (FTP) servers, network attached storage (NAS) devices, local disk drives, or any other type of device or storage medium capable of storing data. Storage media may include Blu-ray discs, DVDs, CD-ROMs, magnetic disks, flash memory, or any other suitable digital storage media. When the techniques described herein are implemented partially in software, a device may store instructions for the software in a suitable, non-transitory computer-readable medium and execute the instructions in hardware using one or more processors.

System 100 represents an example of a system that may be configured to allow digital media content, such as, for example, television programming, a movie, a live sporting event, etc., and data and applications and multimedia presentations associated therewith (e.g., caption services), to be distributed to and rendered by a one or more of computing devices, such as receiver device 103. In the example illustrated in FIG. 1, set-top boxes 102A-102N may include any device configured to receive data from television service provider site 106. For example, set-top boxes 102A-102N may be equipped for wired and/or wireless communications and may include televisions, including so-called smart televisions, set-top boxes, and digital video recorders. Further, set-top boxes 102A-102N may include desktop, laptop, or tablet computers, gaming consoles, mobile devices, including, for example, smart phones, cellular telephones, and personal gaming devices configured to receive data from television service provider site 106. Receiver device 103 may include any device configured to receive multimedia signals from a set-top box and may be a distinct device from a set-top box or may be integrated as part of a set-top box. It should be noted that although system 100 is illustrated as having distinct sites, such an illustration is for descriptive purposes and does not limit system 100 to a particular physical architecture. Functions of system 100 and sites included therein may be realized using any combination of hardware, firmware and/or software implementations.

Television service network 104 is an example of a network configured to enable digital media content, which may include television services, to be distributed and/or redistributed. For example, television service network 104 may include a network maintained by a MVPD, and may include, for example, public or subscription-based over-the-air television networks, public or subscription-based satellite television service provider networks, and public or subscription-based cable television provider networks and/or OTT or Internet service provider networks. It should be noted that although in some examples television service network 104 may primarily be used to enable television services to be provided, television service network 104 may also enable other types of data and services to be provided according to any combination of the telecommunication protocols described herein. Further, it should be noted that in some examples, television service network 104 may enable two-way communications between television service provider site 106 and one or more of set-top boxes 102A-102N. Television service network 104 may comprise any combination of wireless and/or wired communication media. Television service network 104 may include coaxial cables, fiber optic cables, twisted pair cables, wireless transmitters and receivers, routers, switches, repeaters, base stations, or any other equipment that may be useful to facilitate communications between various devices and sites. Television service network 104 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, Society of Cable Telecommunications Engineers (SCTE) standards, W3C standards, and UPnP standards.

Referring again to FIG. 1, television service provider site 106 may be configured to distribute television service via television service network 104. For example, television service provider site 106 may include one or more broadcast stations, a cable television provider, a satellite television provider, or an Internet-based television provider. That is, television service provider site 106 may be a site maintained by an MVPD. In the example, illustrated FIG. 1 television service provider site 106 may be configured to redistribute television content for example, television service provider site 106 may include a site maintain by a MVPD and may receive one or more content feeds from one or more of content provider sites 114A-114N. Content provider sites 114A-114N represent examples of sites that may generate multimedia content. For example, a content provider site may include a studio having one or more studio content servers configured to provide multimedia files and/or streams to television service provider site 106. In one example, content provided sites may include a television station (e.g., a national broadcaster site, a local affiliate, etc.) and may be configured to provide television programming to television service provider site 106 through a physical transmission mechanism. A physical transmission mechanism may include a satellite uplink and/or downlink mechanism, a broadcast transmission, and combinations thereof. In one example, television service provider site 106 may include a cable television service site and television service provider site 106 may redistribute a television broadcast from a local television station to set-top boxes 102A-102N through television service network 104. Further, as illustrated in FIG. 1, television service provider site 106 may be in communication with wide area network 112 and may be configured to receive data from content provider sites 114A-114N and further receive data from data provider sites 116A-116N through wide area network 112. It should be noted that in some examples, television service provider site 106 may include a television studio and content may originate therefrom. In one example, content provider sites 114A-114N may be configured to provide multimedia content using the IP suite. For example, a content provider site may be configured to provide multimedia content to a receiver device and/or television service provider site 106 according to Real Time Protocol (RTP), Real Time Streaming Protocol (RTSP), or HTTP (Hypertext Transfer Protocol).

In the example illustrated in FIG. 1, television service provider site 106 includes service distribution engine 108 and database 110. Service distribution engine 108 may be configured to receive data, including, for example, multimedia content, interactive applications, and messages, and distribute data to set-top boxes 102A-102N through television service network 104. For example, service distribution engine 108 may be configured to receive television services according to aspects of the one or more of the transmission standards described above (e.g., an ATSC standard). Database 110 may include storage devices configured to store data including, for example, multimedia content and data associated therewith, including for example, descriptive data and executable interactive applications. For example, a sporting event may be associated with an interactive application that provides statistical updates. Data associated with multimedia content may be formatted according to a defined data format, such as, for example, Hypertext Markup Language (HTML), Dynamic HTML, Extensible Markup Language (XML), and JSON, and may include URLs and URIs enabling set-top boxes 102A-102N and/or a corresponding receiver device 103 to access data, e.g., from one of data provider sites 116A-116N. In some examples, television service provider site 106 may be configured to provide access to stored multimedia content and distribute multimedia content to one or more of set-top boxes 102A-102N through television service network 104. For example, multimedia content (e.g., music, movies, and television (TV) shows) stored in database 110 may be provided to a user via television service network 104 on a so-called on demand basis.

Wide area network 112 may include a packet-based network and may operate according to a combination of one or more telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 112 may comprise any combination of wireless and/or wired communication media. Wide area network 112 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 112 may include the Internet.

Data provider sites 116A-116N may be configured to provide data, including hypertext based content, and the like, to receiver device 103 and/or television service provider site 106 through wide area network 112. A data provider site 116A-116N may include one or more web servers. Further data provider sites 116A-116N may include one or more databases, which may be similar to database 110 described above. Data provided by data provider site 116A-116N may be defined according to data formats, such as, for example, HTML, Dynamic HTML, XML, and JSON. An example of a data provider site includes the United States Patent and Trademark Office website. It should be noted that in some examples, data provided by data provider sites 116A-116N may be utilized for redistribution scenarios. Further, in some examples, data provided by data provider sites 116A-116N may be used to enable so-called second screen or companion device applications. For example, companion device(s) in communication with a receiver device may display a website in conjunction with television programming being presented on the receiver device. It should be noted that data provided by data provider sites 116A-116N may include audio and video content. For example, data provider sites 116A-116N may include a television network website (e.g., NBC.com), advertisement server, and the like. In this manner, data and content may be provided by multiple sites in an interchangeable manner. For example, television network website may provide video content and data during a primary presentation of a television program and an advertisement server may provide video content and data (e.g., a pop-up window) during a commercial break. Further, in one example, data provider sites 116A-116N may be configured to generate data or documents including applications and/or data elements that describe applications according to one or more of the techniques described herein.

Registration authority site 117 may be configured to provide an IP address corresponding to one of data provider sites 116A-116N in response to a query. For example, as described in detail below, a receiver device may query registration authority site 117 for an IP address associated with a broadcaster identifiers. Further, registration authority site 117 may be configured to forward a request to one of data provider sites 116A-116N. For example, as described in detail below, a receiver device may request supplemental content using a URI including broadcaster identifier. The request may be directed to registration authority site 117 and registration authority site 117 may forward the request to a particular one of data provider sites 116A-116N based on the value of a broadcaster identifier.

As described above, service distribution engine 108 may be configured to receive data, including, for example, multimedia content, interactive applications, and messages, and distribute data to set-top boxes 102A-102N through television service network 104. For example, service distribution engine 108 may be configured to receive one or more data streams and output proprietary signals to distribute the content to set-top boxes 102A-102N. A data stream may generally refer to data encapsulated in a set of one or more data packets.

Figure 2:
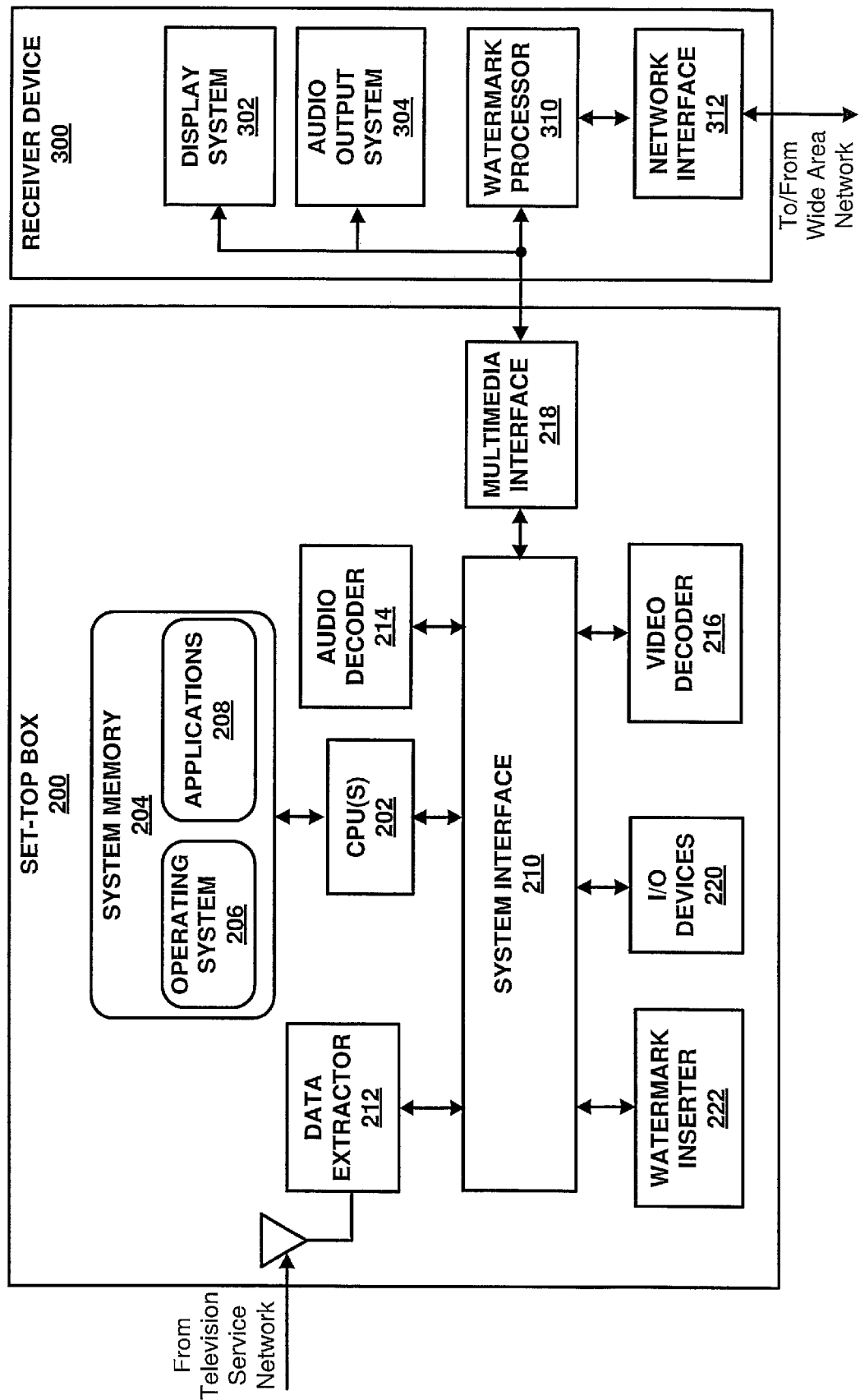
FIG. 2 is a block diagram illustrating an example of a set-top box and an example receiver device that may implement one or more techniques of this disclosure.

As further, described above, an example of a redistribution scenario may include a situation where a receiver device receives a multimedia signal from a set-top box and recovers embedded information from the multimedia signal. FIG. 2 is a block diagram illustrating an example of a set-top box and an example receiver device that may implement one or more techniques of this disclosure. Set-top box 200 is an example of a computing device that may be configured to receive data from a communications network and output a signal representing multimedia content. Receiver device 300 is an example of a computing device that may be configured to receive a signal representing multimedia content and cause visual and auditory data to be rendered from the received signals and further extract watermarks from received signals according to one or more techniques of this disclosure. In the example illustrated in FIG. 2, set-top box 200 and receiver device 300 are illustrated as separate distinct devices for illustration purposes. It should be noted that in other examples, set-top box 200 and receiver device 300 may be incorporated as a single device. Further, in the example illustrated in FIG. 2, set-top box 200 is configured to receive data via a television network, such as, for example, television service network 104 described above. It should be noted that in other examples, set-top box 200 may be configured to additionally or alternatively receive data through a wide area network.

As illustrated in FIG. 2, set-top box 200 includes central processing unit(s) 202, system memory 204, system interface 210, data extractor 212, audio decoder 214, video decoder 216, multimedia interface 218, I/O device(s) 220, and watermark inserter 222. As further illustrated in FIG. 2, system memory 204 includes operating system 206 and applications 208. Each of central processing unit(s) 202, system memory 204, system interface 210, data extractor 212, audio decoder 214, video decoder 216, multimedia interface 218, I/O device(s) 220, and watermark inserter 222 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although set-top box 200 is illustrated as having distinct functional blocks, such an illustration is for descriptive purposes and does not limit set-top box 200 to a particular hardware architecture. Functions of set-top box 200 may be realized using any combination of hardware, firmware and/or software implementations.

CPU(s) 202 may be configured to implement functionality and/or process instructions for execution in set-top box 200. CPU(s) 202 may include single and/or multi-core central processing units. CPU(s) 202 may be capable of retrieving and processing instructions, code, and/or data structures for implementing one or more of the techniques described herein. Instructions may be stored on a computer readable medium, such as system memory 204. System memory 204 may be described as a non-transitory or tangible computer-readable storage medium. In some examples, system memory 204 may provide temporary and/or long-term storage. In some examples, system memory 204 or portions thereof may be described as non-volatile memory and in other examples portions of system memory 204 may be described as volatile memory. System memory 204 may be configured to store information that may be used by set-top box 200 during operation. System memory 204 may be used to store program instructions for execution by CPU(s) 202 and may be used by programs running on set-top box 200 to temporarily store information during program execution. Further, in the example where set-top box 200 is included as part of a digital video recorder, system memory 204 may be configured to store numerous video files.

Applications 208 may include applications implemented within or executed by set-top box 200 and may be implemented or contained within, operable by, executed by, and/or be operatively/communicatively coupled to components of set-top box 200. Applications 208 may include instructions that may cause CPU(s) 202 of set-top box 200 to perform particular functions. Applications 208 may include algorithms which are expressed in computer programming statements, such as, for-loops, while-loops, if-statements, do-loops, etc. Applications 208 may be developed using a specified programming language. Examples of programming languages include, Java™, Jini™, C, C++, Objective C, Swift, Perl, Python, PhP, UNIX Shell, Visual Basic, and Visual Basic Script. As illustrated in FIG. 2, applications 208 may execute in conjunction with operating system 206. That is, operating system 206 may be configured to facilitate the interaction of applications 208 with CPUs(s) 202, and other hardware components of set-top box 200. Operating system 206 may be an operating system designed to be installed on set-top boxes, digital video recorders, televisions, and the like. It should be noted that techniques described herein may be utilized by devices configured to operate using any and all combinations of software architectures.

System interface 210 may be configured to enable communications between components of set-top box 200. In one example, system interface 210 comprises structures that enable data to be transferred from one peer device to another peer device or to a storage medium. For example, system interface 210 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices (e.g., proprietary bus protocols). As described above, set-top box 200 is configured to receive and data via a television service network. As described above, a television service network may operate according to a telecommunications standard. A telecommunications standard may define communication properties (e.g., protocol layers), such as, for example, physical signaling, addressing, channel access control, packet properties, and data processing. In the example illustrated in FIG. 2, data extractor 212 may be configured to extract video, audio, and data from a signal. A signal may be defined according to proprietary and/or standardized aspects. Data extractor 212 may be configured to extract video, audio, and data, from a signal generated by television service provider site 106 described above.

Data packets may be processed by CPU(s) 202, audio decoder 214, and video decoder 216. Audio decoder 214 may be configured to receive and process audio packets. For example, audio decoder 214 may include a combination of hardware and software configured to implement aspects of an audio codec. That is, audio decoder 214 may be configured to receive audio packets and output an audio data signal. Audio data may be coded using multi-channel formats such as those developed by Dolby and Digital Theater Systems. Audio data may be coded using an audio compression format. Examples of audio compression formats include Motion Picture Experts Group (MPEG) formats, Advanced Audio Coding (AAC) formats, DTS-HD formats, and Dolby Digital (AC-3) formats. Video decoder 216 may be configured to receive and process video packets. For example, video decoder 216 may include a combination of hardware and software used to implement aspects of a video codec. In one example, video decoder 216 may be configured to decode video data encoded according to any number of video compression standards, such as ITU-T H.262 or ISO/IEC MPEG-2 Visual, ISO/IEC MPEG-4 Visual, ITU-T H.264 (also known as ISO/IEC MPEG-4 AVC), and High-Efficiency Video Coding (HEVC). It should be noted that video data and audio data received at television service provider site 106 from a content provider may be decoded according to one format and re-encoded according to another format, including an MVPD's proprietary formats.

I/O device(s) 220 may be configured to receive input and provide output during operation of set-top box 200. That is, I/O device(s) 220 may enable a user to select multimedia content to be rendered. Input may be generated from an input device, such as, for example, a push-button remote control, a device including a touch-sensitive screen, a motion-based input device, an audio-based input device, or any other type of device configured to receive user input. I/O device(s) 220 may be operatively coupled to set-top box 200 using a standardized communication protocol, such as for example, Universal Serial Bus protocol (USB), Bluetooth, ZigBee or a proprietary communications protocol, such as, for example, a proprietary infrared communications protocol.

As described above, in some examples, an MVPD may embed a watermark in a video signal to enhance content originating from a content provider. In the example, illustrated in FIG. 2, set-top includes watermark inserter 222 which may be configured to embed a watermark in a multimedia signal according to one or more techniques for this disclosure. Examples of how watermark inserter 222 may embed a watermark in a multimedia signal are described in greater detail below. As further described above, a receiver device may receive a multimedia signal (e.g., an uncompressed video signal) from a multimedia interface. Multimedia interface 218 is configured to output a multimedia signal to receiver device 300. Multimedia interface 218 may be configured to output a multimedia signal according to a defined multimedia signal format, including, for example, an HDMI format, a DisplayPort format, and other digital or analog formats (e.g., component video formats). Further, it should be noted that it in some examples, multimedia interface 218 may be configured to output a multimedia signal according to a wireless signal format (e.g., WirelessHD, etc.). It should be noted that the techniques described herein are generally applicable regardless of how a receiver device receives multimedia data.

Referring again to FIG. 2, receiver device 300 includes display system 302, audio output system 304, watermark processor 310, and network interface 312. Each of display system 302, audio output system 304, watermark processor 310, and network interface 312 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although receiver device 300 is illustrated as having distinct functional blocks, such an illustration is for descriptive purposes and does not limit receiver device to a particular hardware architecture. Functions of receiver device may be realized using any combination of hardware, firmware and/or software implementations. Further, it should be noted that receiver device 300 may include functional blocks having functionality similar to functional blocks included in set-top box 200. For example, receiver device 300 may include one or more of central processing unit(s), system memory, system interface, data extractor, audio decoder, video decoder, multimedia interface, and/or I/O device(s). For example, in the case where receiver device 300 includes a digital television, receiver device 300 may be configured receive data from a communications network (e.g., an over the air broadcast) and extract a signal representing multimedia content in addition to receiving multimedia signals from set-top box 200. In this case, receiver device 300 may be configured receive data from a communications network and extract a signal representing multimedia content in a manner similar to that described above with respect to set-top box 200. For the sake of brevity a description of such functional blocks configured to receive data from a communications network and extract a signal representing multimedia content is not repeated with respect to receiver device 300.

Display system 302 may be configured to retrieve and process video data for display. For example, display system 302 may receive pixel data from a video signal and output data for visual presentation. Further, display system 302 may be configured to output graphics in conjunction with video data, e.g., graphical user interfaces. Display system 302 may comprise one of a variety of display devices such as a liquid crystal display (LCD), a plasma display, an organic light emitting diode (OLED) display, or another type of display device capable of presenting video data to a user. A display device may be configured to display standard definition content, high definition content, or ultra-high definition content. Further, in some examples, a display device may be configured to operate according to an overscan mode. Audio output system 304 may be configured to render audio data. For example, audio output system 304 may include an audio processor, a digital-to-analog converter, an amplifier, and a speaker system. A speaker system may include any of a variety of speaker systems, such as headphones, an integrated stereo speaker system, a multi-speaker system, or a surround sound system.

Watermark processor 310 may be configured to extract a watermark from a multimedia data signal according to one or more techniques described herein. Examples of how watermark process may extract a watermark embedded in a multimedia signal are described in greater detail below. Network interface 312 may be configured to enable receiver device 300 to send and receive data via a local area network and/or a wide area network. Network interface 312 may include a network interface card, such as an Ethernet card, an optical transceiver, a radio frequency transceiver, or any other type of device configured to send and receive information. Network interface 312 may be configured to perform physical signaling, addressing, and channel access control according to the physical and Media Access Control (MAC) layers utilized in a network. As described above, URIs, including URIs embedded in a watermark, may cause a receiver device to connect to server(s) to download additional data. Network interface 312 may be configured to receive URIs, including those received from watermark processor 310 and connect to server(s) identified in the URIs.

As described above, a watermark inserter, including a watermark inserter included at a content provider site (e.g., content provider site 114N), a television provider site (e.g., television provider set), or a set-top box (e.g., set-top box 200), may be configured to embed a watermark in a multimedia signal. Further, a watermark inserter may be configured to generate a watermark including information associated with resource identifier, including a URI having component parts arranged according to the scheme://authority/path format described above.

In one example, as described in further detail below, an authority component may include a trusted a Domain Name Server (DNS) root domain. In one example, an authority component may include a broadcaster identifier. In one example, a broadcaster identifier may include a unique identifier issued by a registration authority. In one example, a registration authority may include an organization that develops transmission standards (e.g., the ATSC, etc.) or another governing body (e.g., the Federal Communications Commission (FCC), etc.). A registration authority may maintain list of issued broadcaster identifiers. Examples of broadcaster identifiers are described in further detail below. Further, in some examples, a receiver device may be configured to generate a resource identifier by combining a broadcaster identifier with a particular root domain, e.g., a trusted root domain associated with a registration authority. Thus, in some examples, a watermark inserter may be configured to generate a watermark including resource identifiers based on the following resource identifier formats:

scheme://{registration authority root}/{ broadcaster identifier}/path or scheme://{broadcaster identifier}.{registration authority root}/path In some examples, {registration authority root} includes a trusted DNS, and in some examples, should not be derivable from watermark data. In one example, {registration authority root} may be stored on a receiver device. In some examples, the value of {registration authority root} may be updated, or modified. In one examples only a registration authority may update {registration authority root}. In this manner, the security of {registration authority root} may be maintained.

Further, in some examples, a watermark inserter may be configured such that a portion of an authority component is signaled as part of a header of a watermark message and a portion or all of a path component (e.g., a resource specific character string) is signaled as part of an instance of a watermark message. Further, in some examples, a portion or all of a path component may be signaled in header of a watermark message. Thus, in some examples, a watermark inserter may be configured to generate a watermark including resource identifiers based on the following resource identifier formats:

scheme://{broadcaster identifier}. {registration authority root}/uri_string_i ( )

or scheme://{broadcaster identifier}. {registration authority root}/uri_string_h( )uri_string_i( )

where {broadcaster identifier} is signaled in a watermark message header and uri_string_h( ) is signaled in a watermark message header and uri_string_i( ) is signaled in an instance of a watermark message.

As described in further detail below, a receiver device may provide a {broadcaster identifier} to a server corresponding to a {registration authority root} and the server corresponding to the {registration authority root} may provide an IP address associated with {broadcaster identifier} and/or forward a request to a server associated with the IP address associated with {broadcaster identifier}. In this manner, a receiver device may receive supplemental content through a trusted server.

As described above, with respect to Table 6 and Table 8, in A/336, uri_message( ) and emergency_alert_message( ) may include resource identifying information. In some examples, a watermark inserter may be configured such that resource identifying information included in a uri_message( ) or an emergency_alert_message( ) is signaled according to the following format:

https://{BSID_code}.atsc3.tv/a336/{wm_message_id_code}/{uri_type_code}/uri_string( )

or http://{BSID_code}.atsc3.tv/a336/{wm_message_id_code}/{uri_type_code}/uri_string( )

where

{BSID_code}, in one example, is the 4-character hexadecimal representation of the 16-bit broadcaster_id which is sent in a wm_message_block( ) header and 16-bit broadcaster_id is the unique identifier issued by a ATSC registration authority.

atsc3.tv, in one example, is the host name of a trusted DNS associated with an ATSC registration authority.

{wm_message_id_code}, in one example, is a 2-character hexadecimal representation of the 8-bit wm_message_id which is sent in the wm_message_block( ) header. In one example, for a URI message the value of {wm_message_id_code} may be equal to "03." In one example, for an emergency alert message the value of {wm_message_id_code} may be equal to "06."

{uri_type_code}, in one example, is a 2-character hexadecimal representation of the 8-bit uri_type; and where for emergency alert messages which, in some examples, do not have a defined uri_type, the CAP_message_ID shall be used instead. As described above, in some examples, CAP_message_ID may have multi-byte length, thus, in some cases, the resulting {CAP_message_id_code} may have multiple of 2-character hexidecimal codes.

uri_string( ), in one example, is a character string defined in various watermark messages.

Table 13 provides an example syntax for a header of a uri_message( ) included in a watermark payload according to one or more of the techniques described herein. In the example illustrated in Table 13, respective syntax elements wm_message_id, wm_message_block_length, wm_message_version, fragment_number, last_fragment, wm_message_bytes( ) message_CRC_32, and CRC_32 may, in some examples, have a definitions based on definitions provide above with respect to Table 1.

TABLE 13

| Syntax | No. of Bits | Format |
|---|---|---|
| wm_message_block( ) { | | |
|   wm_message_id | 8 | uimsbf |
|   wm_message_block_length | 8 | uimsbf |
|   wm_message_version | 4 | uimsbf |
|   fragment_number | 2 | uimsbf |
|   last_fragment | 2 | uimsbf |
|   if (fragment_number == 0) | | |
|     broadcast_id | 16 | uimsbf |

TABLE 13-continued

| Syntax | No. of Bits | Format |
|---|---|---|
|   wm_message_bytes( ) | var | |
|   if ((fragment_number == last_fragment) && (fragment_number != 0)) { | | |
|     message_CRC_32 | 32 | uimsbf |
|   } | | |
|   CRC_32 | 32 | uimsbf |
| } | | |

Referring to Table 13, broadcaster_id syntax element may be based on the following definition:

broadcaster_id—This 16-bit unsigned integer field shall uniquely identify the broadcaster. The ID is expected to be issued by an ATSC 3.0 registration authority.

It should be noted that although in the example illustrated in Table 13, broadcaster_id is illustrated as being included in the first fragment, in other examples, broadcaster_id may be present in additional fragments. In other examples, broadcaster_id may also be present within the message body such as wm_message_bytes( ).

Table 14 provides an example syntax for an instance of a uri_message( ) according to one or more techniques described herein. In Table 14, syntax elements uri_type and uri_strlen, in some examples, may have a definitions based on definitions provided above with respect to Table 6.

TABLE 14

| Syntax | No. of Bits | Format |
|---|---|---|
| uri_message( ) { | | |
|   uri_type | 8 | uimsbf |
|   uri_strlen | 8 | uimsbf |
|   URI_string( ) | 8*uri_strlen | |
| } | | |

Referring to Table 14, syntax element URI_string( ) may in some examples be based on the following example definition:

URI_string( )—A URI consisting of characters whose values shall be restricted to those allowed for Uniform Resource Identifiers (URIs) by RFC 3986. The length of the string shall be as given by the value of uri_len. The character string, after reassembly if the URI is sent in fragments, shall contain only the URI Syntax Components of path, query, and fragment per RFC 3986. The URI_string( ) shall be used to construct an HTTPS request as follows:

https://{BSID_code}.atsc3.tv/a336/{wm_message_id_code}/{uri_type_code}/URI_string( )

or http://{BSID_code}.atsc3.tv/a336/{wm_message_id_code}/{uri_type_code}/URI_string( )

In this manner, the potential values of resource identifiers that may be derived by a receiver device from URI_string( ) may be restricted to particular authorities that may be validated by the receiver device and as such, may prevent a receiver device from downloading malicious data from an unknown source.

Referring Tables 3-4, A/336r7 describes where a video watermark payload may include uri_message( ) Tables 15A-15C provide example syntax for an instance of a uri_message( ) according to one or more techniques described herein.

TABLE 15A

| Syntax | No. of Bits | Format |
|---|---|---|
| uri_message( ) { | | |
| bsid | 16 | uimsbf |
| ans_id | 8 | uimsbf |
| uri_type | 8 | uimsbf |
| uri_strlen (N1) | 8 | uimsbf |
| URI_string( ) | 8*N1 | N1*char |
| } | | |

TABLE 15B

| Syntax | No. of Bits | Format |
|---|---|---|
| uri_message( ) { | | |
| ans_id | 8 | uimsbf |
| ans_strlen_minus1 (N1) | 8 | uimsbf |
| ans_string | 8*(N1+1) | N1*char |
| uri_type | 8 | uimsbf |
| uri_strlen (N2) | 8 | uimsbf |
| URI_string | 8*N2 | N2*char |
| } | | |

TABLE 15C

| Syntax | No. of Bits | Format |
|---|---|---|
| uri_message( ) { | | |
| ans_id | 4 | uimsbf |
| ans_strlen_minus1 (N1) | 4 | uimsbf |
| ans_string | 8*(N1+1) | N1*char |
| uri_type | 8 | uimsbf |
| uri_strlen (N2) | 8 | uimsbf |
| URI_string | 8*N2 | N2*char |
| } | | |

In each of Tables 15A-15C, syntax element uri_type may be based on the definition provided above with respect to Table 6. In each of Tables 15A-15B syntax element ans_id may be based on the following definition:

ans_id—This 8-bit field shall indicate the identifier code of an authorized ATSC 3.0 Name Server (ANS).

Thus, ans_id may be an example of a {code_type}, as described below with respect to Table 16. Referring to Table 15A, syntax elements bsid and URI_string( ) may in some examples be based on the following example definitions:
bsid—This 16-bit identifier shall indicate the BSID of the Broadcast Stream associated with the service. Its uniqueness is scoped within the name server indicated by the ans_id_field.

URI_string( )—A URI consisting of characters whose values shall be restricted to those allowed for Uniform Resource Identifiers (URIs) by RFC 3986. The length of the string shall be as given by the value of uri_strlen. The character string, after reassembly if the URI is sent in fragments, shall be a valid URL per RFC 3986 and shall contain only the URI Syntax Components of path, query, and fragment per RFC 3986. The URI_string( ) shall be used to construct an HTTPS request as follows:
https://{bsidCode}.{ansidCode}.vp1.tv/uri_string( )
where
{bsidCode} is a 4-character hexadecimal representation of the 16-bit bsid
{ansidCode} is a 2-character hexadecimal representation of the 8-bit ans_id Referring to Table 15B, syntax elements ans_strlen_minus1, ans_string, uri_strlen and URI_string( ) may in some examples be based on the following example definitions:

ans_strlen_minus1—This 8-bit unsigned integer plus 1 shall indicate the length of the ans_string( ).

ans_string—This UTF-8 encoded character string shall be a unique identifier for the service, and its uniqueness is scoped within the name server indicated by the ans_id field.

uri_strlen—An 8-bit unsigned integer that shall signal the number of characters in the uri_string( ) to follow. The combined values of the ans_strlen_minus1+1 and uri_strlen fields shall be less than or equal to 84 for 1X video watermark emission format (1X System) and shall be less than or equal to 204 for 2X video watermark emission format (2X System) [as provided in A/335].

URI_string( )—A URI consisting of characters whose values shall be restricted to those allowed for Uniform Resource Identifiers (URIs) by RFC 3986. The length of the string shall be as given by the value of uri_strlen. The character string, after reassembly if the URI is sent in fragments, shall be a valid URL per RFC 3986 and shall contain only the URI Syntax Components of path, query, and fragment per RFC 3986. The URI_string( ) shall be used to construct an HTTPS request as follows:
https://{ans_string}.{ansidCode}.vp1.tv/uri_string( )
where
{ansidCode} is a 2-character hexadecimal representation of the 8-bit ans_id Referring to Table 15C, syntax element ans_string may be based on the definition provided above for Table 15B and syntax elements ans_id, ans_strlen_minus1, uri_strlen and URI_string( ) may in some examples be based on the following example definitions:

ans_id—This 4-bit field shall indicate the identifier code of an authorized ATSC 3.0 Name Server (ANS).

ans_strleng_minus1—This 4-bit unsigned integer plus 1 shall indicate the length of the ans_string( ).

uri_strlen—An 8-bit unsigned integer that shall signal the number of characters in the uri_string( ) to follow. The combined values of the ans_strlen_minus1+1 and uri_strlen fields shall be less than or equal to 85 for 1X video watermark emission format (1X System) and shall be less than or equal to 205 for 2X video watermark emission format (2X System) [as provided in A/335].

URI_string( )—A URI consisting of characters whose values shall be restricted to those allowed for Uniform Resource Identifiers (URIs) by RFC 3986 [8]. The length of the string shall be as given by the value of uri_strlen. The character string, after reassembly if the URI is sent in fragments, shall be a valid URL per RFC 3986 [8] and shall contain only the URI Syntax Components of path, query, and fragment per RFC 3986 [8]. The URI_string( ) shall be used to construct an HTTPS request as follows:
https://{ans_string}.{ansidCode}.vp1.tv/uri_string( )
where
{ansidCode} is a 1-character hexadecimal representation of the 4-bit ans_id In this manner, a uri_message( ) may indicate the identifier code of an authorized ANS, where identifier code is used to construct an HTTP(S) request. In this manner, the examples illustrated in Tables 15A-15C provide examples where a watermark inserter may be configured to generate a watermark including resource identifiers based on the following resource identifier format:
scheme://{service_identifier}.{code_type}.{registration authority root}/path Table 16 provides example syntax for an instance of a uri_message( ) according to one or more techniques described herein.

TABLE 16

| Syntax | No. of Bits | Format |
|---|---|---|
| uri_message( ) { | | |
| uri_type | 8 | uimsbf |
| domain_code | 8 | uimsbf |
| entity_strlen /* N1 | 8 | uimsbf |
| entity_string( ) | 8*N1 | |
| uri_strlen /* N2 | 8 | uimsbf |
| URI_string( ) | 8*N2 | |
| } | | |

In Table 16, syntax element uri_type may be based on the definition provided above with respect to Table 6, and syntax elements domain_code, entity_strlen, entity_string( ), uri_strlen and URI_string( ) may in some examples be based on the following example definitions:

domain_code—This 8-bit unsigned integer shall indicate the identifier code that shall identify the domain to be used for URL construction, according to the Table 17A in one example or Table 17B in one example.

TABLE 17A

| domain_code value | domain_string |
|---|---|
| 0x00 | "0.vp1.tv" |
| 0x01 | "1.vp1.tv" |
| 0x02 | "2.vp1.tv" |
| 0x03 | "3.vp1.tv" |
| 0x04 | "4.vp1.tv" |
| 0x05 | "5.vp1.tv" |
| 0x06 | "6.vp1.tv" |
| 0x07 | "7.vp1.tv" |
| 0x08 | "8.vp1.tv" |
| 0x09 | "9.vp1.tv" |
| 0x0A | "10.vp1.tv" |
| 0x0B | "11.vp1.tv" |
| 0x0C | "12.vp1.tv" |
| 0x0D | "13.vp1.tv" |
| 0x0E | "14.vp1.tv" |
| 0x0F | "15.vp1.tv" |
| 0x10-0xFF | Reserved |

TABLE 17B

| domain_code value | domain_string |
|---|---|
| 0x00 | "0.vp1.tv" |
| 0x01 | "1.vp1.tv" |
| 0x02 | "2.vp1.tv" |
| 0x03 | "3.vp1.tv" |
| 0x04 | "4.vp1.tv" |
| 0x05 | "5.vp1.tv" |
| 0x06 | "6.vp1.tv" |
| 0x07 | "7.vp1.tv" |
| 0x08 | "8.vp1.tv" |
| 0x09 | "9.vp1.tv" |
| 0x0A | "10.vp1.tv" |
| 0x0B | "11.vp1.tv" |
| 0x0C | "12.vp1.tv" |
| 0x0D | "13.vp1.tv" |
| 0x0E | "14.vp1.tv" |
| 0x0F | "15.vp1.tv" |
| 0x10 | "0.ngbf.org" |
| 0x11 | "0.ngbf.org" |
| 0x12 | "0.ngbf.org" |
| 0x13 | "0.ngbf.org" |
| 0x14 | "0.ngbf.org" |
| 0x15 | "a.futurecom.com" |
| 0x16 | "b.futurecom.com" |
| 0x17 | "alpha.ngtech.co.kr" |
| 0x18-0xFF | Reserved |

In one example, Reserved values in Table 17A and Table 17B may be associated with another type of domain string. For example, a domain string having the format "x.atsc.org" where x is an integer or a string including alpha-numeric characters.

Although the above description uses 8-bits for domain_code syntax element in another alternative example a different number of bits may be used for domain_code syntax element. For example 4-bits, 12-bits or 16-bits may be used for domain_code. In one example, if domain_code uses 4-bits, then uri_type field may be modified to also only use 4-bits such that uri_type and domain_code field together occupy 1-byte. In another example, if domain_code uses 12-bits, then a reserved field of 4-bits may be sent after the domain_code field to facilitate byte-alignment of fields.

entity_strlen—An 8-bit unsigned integer that shall signal the number of characters in the entity_string( ) to follow.

In one example, the field entity_strlen may instead be signaled as field entity_strlen_minus1.

In this case, the semantics may be as follows:

entity_strlen_minus1—An 8-bit unsigned integer that plus 1 shall signal the number of characters in the entity_string( ) to follow.

In other examples, a minus 2, minus 3, or minus 4 encoding may be used for indicating the length of entity_string( ).

In each of these respective cases, the syntax element signaled to indicate the length of entity_string( ) may be one of the following:

entity_strlen_minus2—An 8-bit unsigned integer that plus 2 shall signal the number of characters in the entity_string( ) to follow.

entity_strlen_minus3—An 8-bit unsigned integer that plus 3 shall signal the number of characters in the entity_string( ) to follow.

entity_strlen_minus4—An 8-bit unsigned integer that plus 4 shall signal the number of characters in the entity_string( ) to follow.

It should be noted that in some cases, the minus 4 signaling may be preferred as a shortest top level domain may be 2 characters and a period ('.') requires one character and a shortest second level domain may be at least 1 character.

entity_string( )—This string shall be an IANA-registered domain name consisting of at least a top-level domain and a second-level domain. Higher-level domains may be present. Period characters ('.') shall be included between the top-level, second-level, and any higher level domains. The length of entity_string( ) shall be as given by the value of entity_strlen.

uri_strlen—An 8-bit unsigned integer that shall signal the number of characters in the uri_string( ) to follow. The combined values of the entity_strlen and uri_strlen fields shall be less than or equal to 84 for 1X video watermark emission format (1X System) and shall be less than or equal to 204 for 2X video watermark emission format (2X System) [as provided in A/335].

URI_string( )—A URI consisting of characters whose values shall be restricted to those allowed for Uniform Resource Identifiers (URIs) by RFC 3986. The length of the string shall be as given by the value of uri_strlen.

The receiver is expected to form the URL it will use to retrieve the referenced content by the following procedure. The URL shall be formed by appending the entity string, with the string domain_string followed by "/" followed by the URI_string string. The URL, after reassembly if sent in fragments, shall be a valid URL per RFC 3986 and shall contain only the URI syntax components of path, query, and fragment per RFC 3986. The URI_string( ) shall be used to construct an HTTPS request as follows:

https://entity_string.domain_string/URI_string( )

Table 18 provides an example syntax for an instance of an emergency_alert_message( ) according to one or more techniques described herein. In Table 18, syntax elements CAP_message_ID_length, CAP_message_ID, CAP_message_url_length, expires, urgency, severity_certainty, in some examples, may have definitions based on definitions provided above with respect to Table 8.

TABLE 18

| Syntax | No. of Bits | Format |
|---|---|---|
| emergency_alert_message( ) { | | |
|   CAP_message_ID_length (N1) | 8 | uimsbf |
|   CAP_message_ID | 8*(N1) | |
|   CAP_message_url_length (N2) | 8 | uimsbf |
|   CAP_message_url | 8*(N2) | |
|   expires | 32 | uimsbf |
|   urgency | 1 | bslbf |
|   severity_certainty | 4 | bslbf |
|   reserved | 3 | "111" |
| } | | |

Referring to Table 18, syntax element CAP_message_url, in some examples, may be based on the following definition:

CAP_message_url—This string shall give the URL that can be used to retrieve the CAP message. The CAP_message_url shall contain only the URI Syntax Components of path, query, and fragment per RFC 3986. The CAP_message_url shall be used to construct an HTTPS request as follows:

https://{BSID_code}.atsc3.tv/a336/{wm_message_id_code}/{CAP_message_id_code}/CAP_message_url
or
http://{BSID_code}.atsc3.tv/a336/{wm_message_id_code}/{CAP_message_id_code}/CAP_message_url In this manner, the potential values of resource identifiers that may be derived by a receiver device from CAP_message_url may be restricted to particular authorities that may be validated by the receiver device and as such, may prevent a receiver device from downloading malicious data from an unknown source.

As described above, a watermark inserter may be configured to generate a watermark including resource identifiers based on one or more of the following resource identifier formats:

scheme://{registration authority root}/{broadcaster identifier}/path
scheme://{broadcaster identifier}.{registration authority root}/path
scheme://{broadcaster identifier}.{registration authority root}/uri_string_i ( )
scheme://{broadcaster identifier}.{registration authority root}/uri_string_h( )/uri_string_i( )

In some examples, it may be useful to include information associated with the country of a registration authority and/or a country of a broadcaster in a resource identifier. That is, in some examples, it may be useful to include country information in {broadcaster identifier} and/or {registration authority root}. In one example, country information may include a country code. It should be noted that in some examples, it may be useful to include other types of codes in {broadcaster identifier} and/or {registration authority root}. Examples of other types of codes include URL construction codes, domain codes, dereferencing codes, local server codes, etc. As described above, {broadcaster identifier} may include a {BSID_code} and {registration authority root} may be atsc3.tv, i.e., the host name of a trusted DNS associated with an ATSC registration authority. Thus, in the example where information associated with the country of a registration authority and/or a country of a broadcaster is included in a resource identifier, a watermark inserter may be configured such that resource identifying information included in a uri_message( ) or an emergency_alert_message( ) is signaled according to the following format:

https://{BSID_code}.{country_code}.atsc3.tv/path
or
http://{BSID_code}.{country_code}.atsc3.tv/path In an example where other types of codes are included in a resource identifier, a watermark inserter may be configured such that resource identifying information included in a uri_message( ) or an emergency_alert_message( ) is signaled according to the following format:

https://{BSID_code}.{code_type}.atsc3.tv/path
or
http://{BSID_code}.{code_type}.atsc3.tv/path Country codes may be based on a defined set of values uniquely identifying particular countries, e.g., a standardized country code set. An example of a standardized country code set includes country code sets defined in ISO 3166 Country Code Collection Standards. ISO 3166-2:2013, Codes for the representation of names of countries and their subdivisions—Part 2: Country subdivision code, which is incorporated by reference herein, provides example country codes. {country_code} may be based on country codes included in ISO 3166-2:2013.

Referring to Table 14 and Table 18, respective syntax elements URI_string( ) and CAP_message_url may in some examples be based on the following example definitions, when country information of a broadcaster and/or a registration authority is included in a URI:

URI_string( )—A URI consisting of characters whose values shall be restricted to those allowed for Uniform Resource Identifiers (URIs) by RFC 3986. The length of the string shall be as given by the value of uri_len. The character string, after reassembly if the URI is sent in fragments, shall contain only the URI Syntax Components of path, query, and fragment per RFC 3986. The URI_string( ) shall be used to construct an HTTPS request as follows:

https://{BSID_code}.{country_code}.atsc3.tv/a336/{wm_message_id_code}/{uri_type_code}/URI_string( )
or
http://{BSID_code}.{country_code}.atsc3.tv/a336/{wm_message_id_code}/{uri_type_code}/URI_string( )

CAP_message_url—This string shall give the URL that can be used to retrieve the CAP message. The CAP_message_url shall contain only the URI Syntax Components of path, query, and fragment per RFC 3986. The CAP_message_url shall be used to construct an HTTPS request as follows:

https://{BSID_code}.{country_code}.atsc3.tv/a336/
{wm_message_id_code}.{CAP_message_id_code}/
CAP_message_url
or
http://{BSID_code}.{country_code}.atsc3.tv/a336/
{wm_message_id_code}.{CAP_message_id_code}/
CAP_message_url
Where {BSID_code} and {country_code} may be based on the following example definitions:
{BSID_code}, in one example, is the 4-character hexadecimal representation of the unique broadcaster identifier issued by the appropriate ATSC registration authority in the country and/or region that the broadcaster operates.

{country_code}, in one example, is a 2-character representation of the country and/or region that the appropriate ATSC registration authority operates. The 2-character country code, in one example, is in accordance to the international designation of ISO 3166-2.

With respect to the example definitions of {BSID_code} and {country_code}, in one example both of {BSID_code} and {country_code} may be determined from syntax element broadcaster_id described above with respect to Table 13. In this example, syntax element broadcaster_id may be based on the following example definition:

broadcaster_id—This 16-bit unsigned integer field shall uniquely identify the broadcaster and the country in which the appropriate registration authority operates. The ID is expected to be issued by an ATSC 3.0 registration authorities in countries where ATSC 3.0 is used.

In one example, 16-bit broadcaster_id may include two parts: a first part that includes a country code and a second part that includes a unique broadcaster identifier issued by the appropriate ATSC registration authority in the country of operation. In one example, the first part of broadcaster_id may include a variable length code word corresponding to a 2-character country code based on ISO 3166-2. In one example, the first part of broadcaster_id may include a fixed length code word corresponding to a 2-character country code based on ISO 3166-2.

It should be noted in the example URIs described above, character string "a336" may more generally represent an example of a {usage} component, where {usage} may be defined as follows:

{usage} is a character string to indicate the specific ATSC standards that the particular http or https request structure adheres.

Further, it should be noted that in some examples, the order of components in URIs described above may be interchanged, e.g., {usage} may be included in a URI before {BSID_code}, etc.

As described above, in A/336, a vp1_payload( ) may be included in an audio watermark or a video watermark. Table 19 provides an example syntax for an instance of an vp1_payload( ) according to one or more techniques described herein. As illustrated in Table 19, the syntax for small_domain( ) is provided in Table 20 and the syntax for large_domain( ) is provided in Table 21. In Tables 19-21 syntax elements domain_type, interval_field, and query_flag may be based on the definitions provided above with respect to Tables 9-11 and ans_id may be based on the example definition provided above with respect to Table 15C. It should be noted that in this manner, in some examples, a {code_type} may be common to various types of watermark messages. Such commonality may simplify the parsing of a resource identifier at a receiver device.

TABLE 19

| Syntax | No. of Bits | Format |
|---|---|---|
| vp1_payload( ) { | | |
|   ans_id | 4 | uimsbf |
|   domain_type | 1 | bslbf |
|   If (domain_type == 0) { | | |
|     small_domain( ) | var | Table 18 |
|   } | | |
|   else { | | |
|     large_domain( ) | var | Table 19 |
|   } | | |
| } | | |

TABLE 20

| Syntax | No. of Bits | Format |
|---|---|---|
| small_domain( ) { | | |
|   server_field | 27 | uimsbf |
|   interval_field | 17 | uimsbf |
|   query_flag | 1 | bslbf |
| } | | |

TABLE 21

| Syntax | No. of Bits | Format |
|---|---|---|
| large_domain( ) { | | |
|   server_field | 19 | uimsbf |
|   interval_field | 25 | uimsbf |
|   query_flag | 1 | bslbf |
| } | | |

In the example illustrated in Tables 19-21, server_field may be based on the example definition provided below and an example range of the Server Code and the Interval Code as a function of domain type may be based on Table 22.

server_field—This field contains the Server Code. The server code value shall be set in accordance with an assignment issued by an authorized ATSC 3.0 Name Server identified by ans_id.

TABLE 22

| Domain Type | Server Code Range (hexadecimal) | Interval Code Range (hexadecimal) |
|---|---|---|
| Small Domain | 00000000-07FFFFFF | 00000000-0001FFFF |
| Large Domain | 00000000-0007FFFF | 00000000-01FFFFFF |

As described above, according to A/336, a URL corresponding to a recovery file shall be constructed from a VP1 payload using the following URL template:

http[s]://{hostName}/a336/rdt/{subdName}/{serverCode}-{intervalCode}.rdt

In the example illustrated in Tables 19-22 intervalCode may be derived as described above and in one example, elements hostName, subdName, and serverCode may be derived as follows:

If the domain_type of the VP1 payload is '0', then:

-continued hostName element may have the value:
    a336.{serverCode1}.{serverCode2}.{serverCode3}.{serverCode4}.0.{ansidCode}vp1.tv;
subName element may have the value:
    {serverCode4}{serverCode3}/{serverCode2}/{serverCode1}; and
serverCode element may have the value:
    {serverCode4}{serverCode3}{serverCode2}{serverCode1};
where ansidCode shall mean the 4-bit ans_id expressed as a single-character uppercase hexadecimal value, and serverCode1, and serverCode2, serverCode3, and serverCode4 may respectively mean the least-to-most significant bytes of the server_field of the VP1 payload (zero-padded at the most-significant bits to the next byte boundary) expressed as two-character uppercase-only hexadecimal values
and if the domain_type of the VP1 watermark code is '1', then:
  hostName element may have the value:
    a336.{serverCode1}.{serverCode2}.{serverCode3}.1.{ansidCode}.vp1.tv;
  subName element may have the value:
    {serverCode3}{serverCode2}/{serverCode1}; and
  serverCode element may have the value:
    {serverCode3}{serverCode2}{serverCode1}
  where ansidCode may mean the 4-bit ans_id expressed as a single-character uppercase
hexadecimal value, and serverCode1, serverCode2, and serverCode3 may respectively mean the least-to-most significant bytes of the server_field of the VP1 payload (zero-padded at the most-significant bit to the next byte boundary) expressed as two-character uppercase-only hexadecimal values.

---

Thus, according to the techniques described herein, for an ansidCode of 6, for a Small Domain a URL corresponding to a recovery file having a server code value of 07ABCDEF and an interval code of 0001ABCD may be constructed as follows:

http[s]://a336.EF.CD.AB.07.0.6.vp1.tv/a336/rdt/07AB/CD/EF/07ABCDEF-01ABCD.rdt and for a Large Domain, a URL corresponding to a recovery file having a server code value of 07ABCD and an interval code of 01ABCDEF may be constructed as follows:
http[s]://a336.CD.AB.07.1.6.vp1.tv/a336/rdt/07AB/CD/07ABCD-01ABCDEF.rdt In this manner, a common element name server, e.g., ansidCode may be signaled for both small domains and large domains and results in a 4-bit reduction in server code for both small and large domains.

Referring to Table 4, A/336r7 provides where syntax element wm_message_id may identify a user private message. A user private message may support delivery of opaque user data in a managed manner. Table 23 provides an example of syntax that has been proposed for a user private message, user_private_message( ).

TABLE 23

| Syntax | No. of Bits | Format |
|---|---|---|
| user_private_message( ) { | | |
|   domain_length (N1) | 8 | uimsbf |
|   domain | 8*(N1) | |
|   payload_length (N2) | 8 | uimsbf |
|   payload | 8*(N2) | |
| } | | |

In Table 23, syntax elements domain_length, domain, payload_length, and payload may be based on the following example definitions:

domain_length—This 8-bit unsigned integer field shall indicate the length of the domain field in bytes.

domain—This variable length field shall conform to taggingEntity token as defined in Section 2.1 of IETF RFC 4151 [IETF: "The 'tag' URI Scheme", RFC 4151, October, 2005], e.g. "atsc.org,2016". The registrant of authorityName in the taggingEntity token shall define the contents of the payload field.

payload_length—This 8-bit unsigned integer field shall indicate the length of the payload field in bytes.

payload—This variable length field contains data not defined in this specification.

It should be noted that the example user private message is allowed be included inside content_id_message or sent as a separate watermark message with a wm_message_id value, where it is allowed to be sent in at most 4 fragments. For example, referring to Table 4, when wm_message_id has a value in the range of 0x80-0xBF, it is allowed to have at most 4 fragments. Further, a user private message is allowed to be sent as a separate watermark message with a wm_message_id value where it is allowed to be sent in at most 256 fragments. For example, referring to Table 4, when wm_message_id has a value in the range of 0xC0-0xFF. It should be noted that in other examples, other values of wm_message_id may respectively indicate a maximum size of 4 fragments and a maximum size of 256 fragments for a user private message.

In the example user_private_message( ) illustrated in Table 23, payload_length is 8 bits, and as such may range from 0 to 255. Thus, payload_length in Table 23 cannot signal user private payloads larger than 255 bytes and as such, cannot accommodate user private message having a maximum size of up to 256 fragments. In one example, according to the techniques described herein payload_length may be based on the following definition:

payload_length—This 16-bit unsigned integer field shall indicate the length of the payload field in bytes.

Table 24 provides an example of syntax for a user private message, user_private_message( ) according to one of more techniques of this disclosure.

TABLE 24

| Syntax | No. of Bits | Format |
|---|---|---|
| user_private_message( ) { | | |
|   domain_length (N1) | 8 | uimsbf |
|   domain | 8*(N1) | |
|   if(wm_message_id==0x01\|\| wm_message_id==0x7F) { | | |
|     payload_length (N2) | 8 | uimsbf |
|   } | | |
|   else { | | |

TABLE 24-continued

| Syntax | No. of Bits | Format |
|---|---|---|
|     payload_length (N2) | 14 | uimsbf |
|     reserved | 2 | uimsbf |
| } | | |
|     payload | 8*(N2) | |
| } | | |

In Table 24, syntax elements domain length, domain, and payload may be based on the definitions provided with respect to Table 23. Syntax element payload_length may be based on the following example definition.

payload_length—This field shall indicate the length of the payload field in bytes.

This field is an 8 bit unsigned integer when this user_private_message is included as ID_Value field in content_id_message( ) (wm_message_id equal to 0x01) or is signaled within a wm_message_block( ) with a wm_message_id indicating a user private message having a maximum size of up to 4 fragments.

This field is a 14 bit unsigned integer when this user private message is signaled within a wm_message_block( ) with wm_message_id indicating a user private message having a maximum size of up to 256 fragments.

In this manner, the example illustrated in Table 24 allows for larger payload_length in the case where a wm_message_id of 0xC0-0xFF (e.g., 0xFF) is used. It should be noted that the length of 14 bits for payload_length is based on the maximum capacity supported by 2X video watermark system and the maximum number of fragments supported. It should be noted that in some examples, payload_length in the example illustrated in Table 24 may be 16 bits in the case where user_private_message is signaled within a wm_message_block( ) with a wm_message_id indicating a user private message having a maximum size of up to 256 fragments.

In one example, distinct user private messages may be signaled. For example, user_private_message_short may be signaled for a wm_message_id indicating a user private message having a maximum size of up to 4 fragments and user_private_message_long may be signaled for a wm_message_id indicating a user private message having a maximum size of up to 256 fragments. In this example, user_private_message_short may include a payload_length having 8 bits and user_private_message_long may include a payload_length having 14 bits (or 16 bits in some examples).

Further, it be noted that in any of the example user private messages above, domain_length and payload_length may be encoded with a minus one coding. That is, for example domain_length and payload_length may respectively be replaced with the following syntax elements:

domain_length_minus1—This 8-bit unsigned integer field plus 1 shall indicate the length of the domain field in bytes.

payload_length_minus1—This field shall indicate the length of the payload field in bytes.

This field is an 8 bit unsigned integer plus 1 when this user_private_message is included as ID_Value field in content_id_message( ) (wm_message_id equal to 0x01) or is signaled within a wm_message_block( ) with a wm_message_id indicating a user private message having a maximum size of up to 4 fragments.

This field is 14 bits [or 16 bit in some examples] unsigned integer plus 1 when this user_private_message is signaled within a wm_message_block( ) with wm_message_id indicating a user private message having a maximum size of up to 256 fragments.

In this manner, devices described herein may be configured to signal and/or parse information in a variable length payload of a watermark message according to the example user private messages described herein.

Figure 3A:
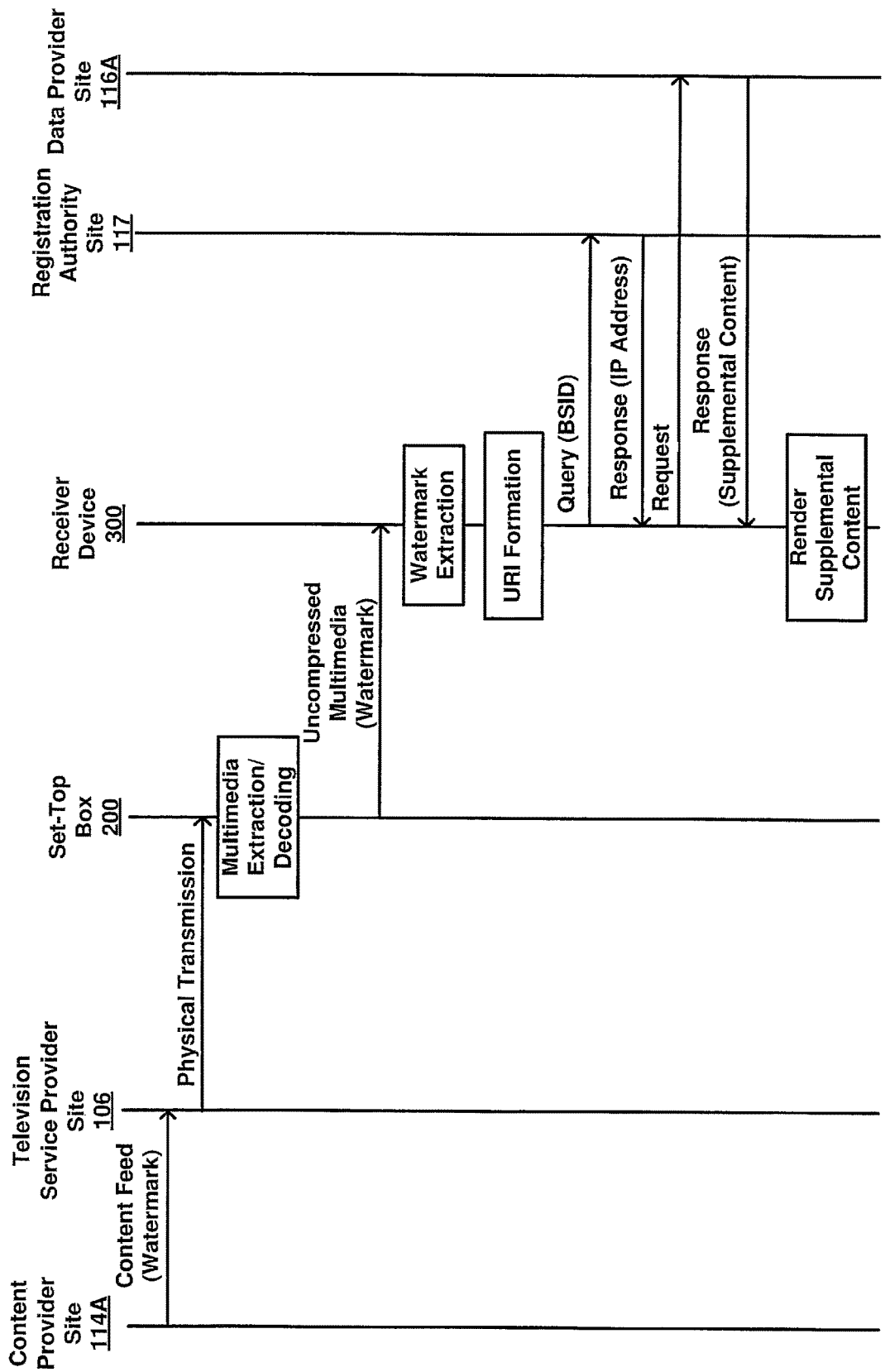
FIG. 3A is a communication flow diagram illustrating an example of a signaling a resource identifier according to one or more techniques of this disclosure.
Figure 3B:
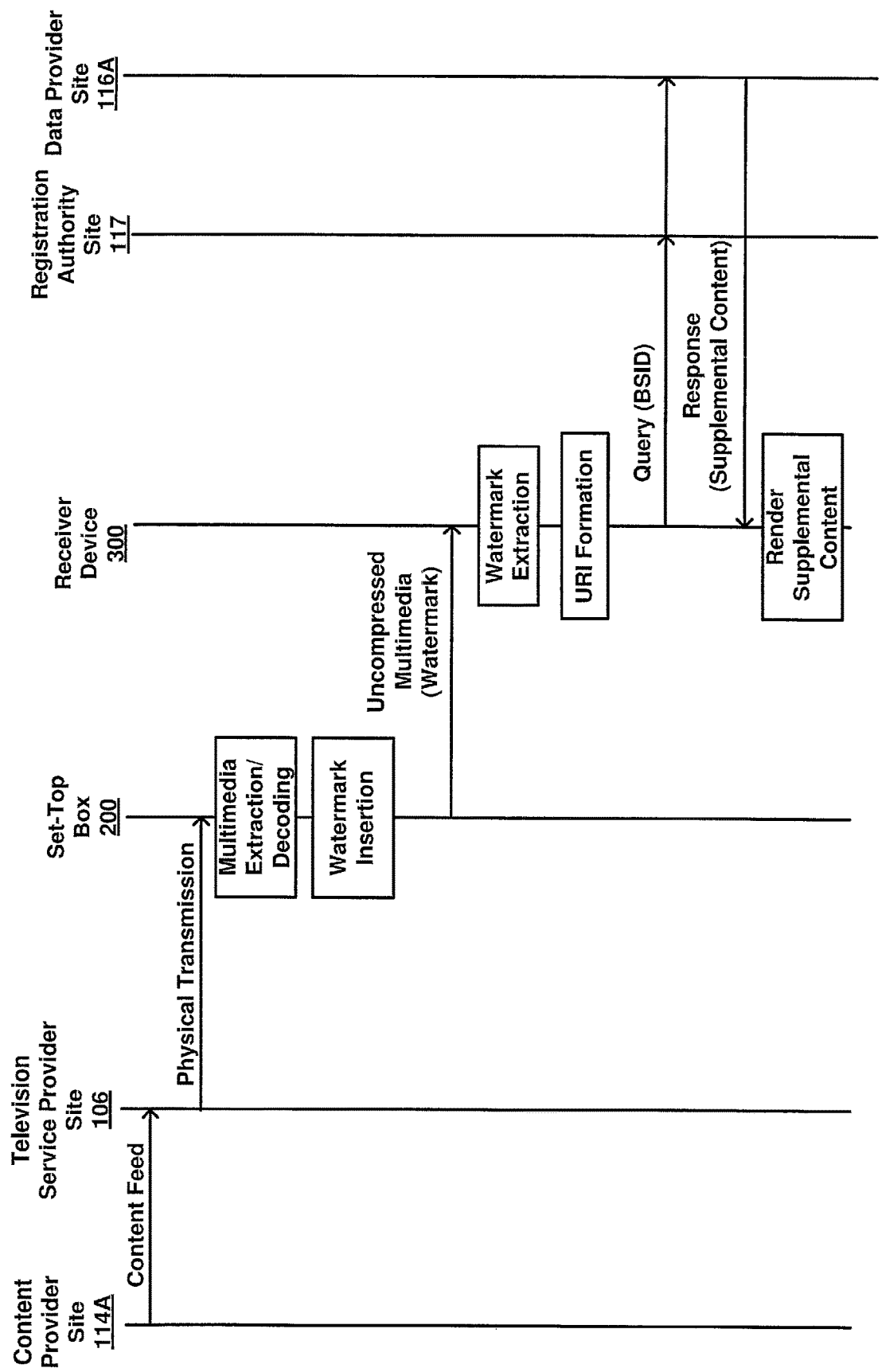
FIG. 3B is a communication flow diagram illustrating an example of a signaling a resource identifier according to one or more techniques of this disclosure.

FIG. 3A and FIG. 3B are communication flow diagrams illustrating an example of a signaling a resource identifier according to one or more techniques of this disclosure. FIG. 3A illustrates an example where content provider site 114A embeds a watermark in a content feed prior to transmitting the content feed to television service provider site 106 for distribution. Further, FIG. 3A illustrates an example where registration authority site 117 uses a round-trip mechanism to provide an IP address associated with data provider site 116A.

FIG. 3B illustrates an example where a watermark is embedded after content provider site 114A transmits a content feed to television service provider site 106 for distribution. In the example, illustrated in FIG. 3B, set-top box 200 embeds a watermark in an uncompressed multimedia signal. Further, FIG. 3B illustrates an example where registration authority site 117 uses a forwarding mechanism to provide an IP address associated with data provider site 116A with an address associated with receiver device 300, such that data provider site 116A may fulfill a request to receiver device 300. It should be noted that a round-trip mechanism may provide an additional layer of privacy for a user of a receiver device and a forwarding mechanism may allow a receiver device 300 to receive and render supplemental content with less latency. In some examples, receiver device 300 may be configured such that a user may be able to set whether a round-trip or forward mechanism is used.

Referring to FIG. 3A, content provider site 114A inserts a watermark into a multimedia signal. Inserting a watermark into a multimedia signal may include, in some examples, embedding digital data into a multimedia signal based on a watermark emission format (e.g., A/334 and/or A/335 described above, or the like). Content provider site 114A may signal portions of a URI using the embedded digital data. Signaling portions of a URI using embedded digital data may include signaling data according to a defined watermark syntax (e.g., syntax provided in Tables 1-20). In one example, a defined watermark syntax may include an identifier. For example, a defined watermark syntax may include a broadcaster identifier as described above. Content provider site 114A transmits a content feed including an embedded watermark to television service provider site 106 for distribution. Television service provider site 106 transmits content feed to set-top box 200 according to a physical transmission protocol. Set-top box 200 receives the physical transmission. Set-top box 200 extracts a multimedia data stream from the physical transmission. For example, set-top box 200 may perform physical, link and network layer, processing, as described above. Set-top box 200 decodes a multimedia signal from an extracted a multimedia data stream. Set-top box 200 may decode a multimedia signal from an extracted a multimedia data stream according to the techniques described above (e.g., Set-top box 200 may decode a video signal from HEVC compliant bitstream).

Referring again to FIG. 3A, set-top box 200 transmits an uncompressed multimedia signal including an embedded watermark to receiver device. Receiver device 300 receives an uncompressed multimedia signal including an embedded watermark. Receiver device 300 extracts the embedded watermark. Extracting a watermark may, in some examples, include retrieving digital data based on a watermark emission format (e.g., A/334 and/or A/335 described above, or the like). Receiver device 300 forms a URI from the extracted digital data. Forming a URI from an URI extracted digital data may include parsing data according to a defined watermark syntax (e.g., syntax provided in any of the Table above). In one example, a defined watermark syntax may include a portion of a URI authority component. For example, a defined watermark syntax may include a broadcaster identifier as described above. Further, a defined watermark syntax may include a service identifier and a code type. In one example, receiver device 300 may form a URI by appending a broadcaster identifier with a registration authority root as part of a URI authority component. As described above, a registration authority root may identify a trusted DNS. In the example illustrated in FIG. 3A, a registration authority root identifies registration authority site 117.

In the example illustrated in FIG. 3A, receiver device 300 queries registration authority site 117 for an IP address corresponding to the broadcaster identifier. Registration authority site 117 provide an IP address corresponding to the broadcaster identifier in the response. In some examples, operators of content provider sites 114A-114N and/or data provider sites 116A-116N, may register with registration authority site in order to be associated with a unique broadcaster identifier. Receiver device 300 requests supplemental content from data provider site 116A. That is, in this example, data provider site 116A is associated with Broadcast Stream Identifier (BSID). Receiver device 300 receives a respond from data provider site 116A including supplemental content. Receiver device 300 renders the supplemental content (e.g., displays live statistics associated with a sporting event, or the like).

Referring to FIG. 3B, content provider site 114A transmits a content feed to television service provider site 106 for distribution. Television provider site 106 transmits content feed to set-top box 200 according to a physical transmission protocol. Set-top box 200 receives the physical transmission. Set-top box 200 extracts a multimedia data stream from the physical transmission. Set-top box 200 decodes a multimedia signal from an extracted a multimedia data stream. Set-top box 200 inserts a watermark into a multimedia signal. Set-top box 200 may insert a watermark signal into a multimedia signal according to one or more of the techniques described above. Set-top box 200 transmits an uncompressed multimedia signal including an embedded watermark to receiver device 300. Receiver device 300 receives an uncompressed multimedia signal including an embedded watermark. Receiver device 300 extracts the embedded watermark. Receiver device 300 forms a URI from the extracted digital data. Receiver device may form a URI from extracted digital data according to the techniques described above. In the example, illustrated in FIG. 3B, receiver device 300 requests registration authority site 117 to forward a request for supplemental content to an IP address corresponding to the broadcaster identifier. Registration authority site 117 determines the IP address corresponding to the broadcaster identifier and forward the request to the data provide site 116A. That is, in this example, data provider site 116A is associated with BSID. Receiver device 300 receives a response from data provider site 116A including supplemental content. Receiver device 300 renders the supplemental content (e.g., displays live statistics associated with a sporting event, or the like).

Figure 4:
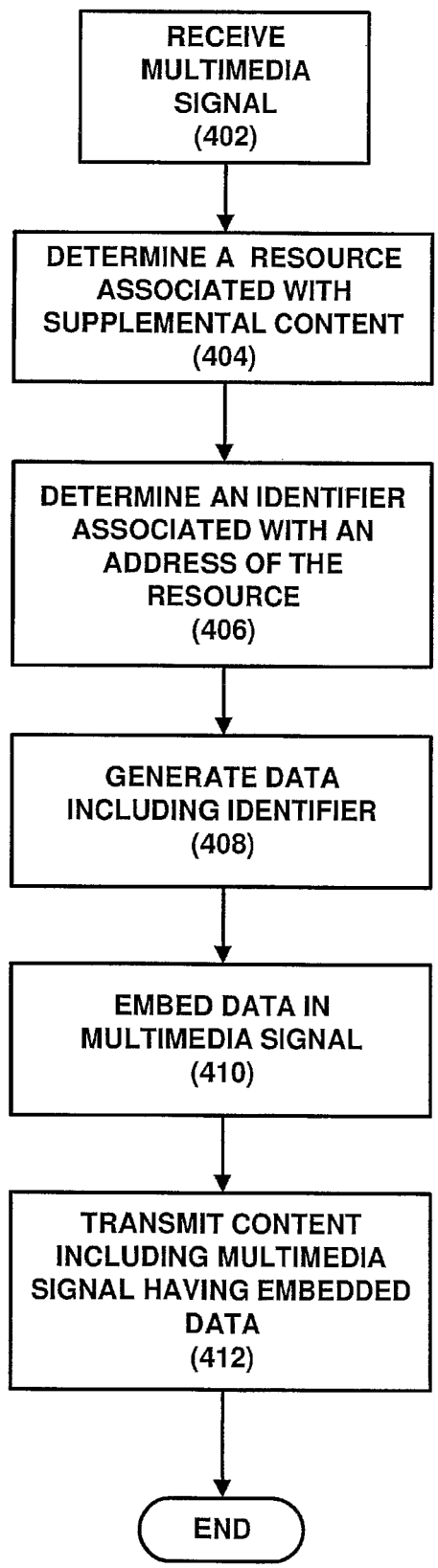
FIG. 4 is a flowchart illustrating an example of a signaling resource identifier information according to one or more techniques of this disclosure.

FIG. 4 is a flowchart illustrating an example of a signal information associated with a according to one or more techniques of this disclosure. It should be noted that although FIG. 4 is described with respect to television service provider site 106, the techniques described with respect to FIG. 4 may be performed by any combination of components described herein. As illustrated in FIG. 4, television service provider site 106 receives a multimedia signal (402). Television service provider site 106 determines a resource associated with supplement content (404). For example, television service provider site 106 may determine an application associated with multimedia is hosted by a particular application server. Television service provider site 106 determines an identifier associated with the address of the resource (406). For example, television service provider site 106 may determine that the IP address of a server hosting an application is associated with a particular broadcast identifier. Television service provider site 106 generates data including the identifier (408). For example, television service provider site 106 may generate data according to one or more of example syntax structures described above. Television service provider site 106 embeds the data in the multimedia signal (410). For example, television service provider site 106 may embeds the data in the multimedia signal according to a specified watermark emission, including the example specified watermark emissions described above. For example, television service provider site 106 transmits content including the multimedia signal having the embedded data (412). For example, television service provider site 106 may transmit data over a television service network, including, for example, television service network 104. In this manner, television service provider site 106 represents an example of a device configured to signal information associated with a resource identifier.

Figure 5:
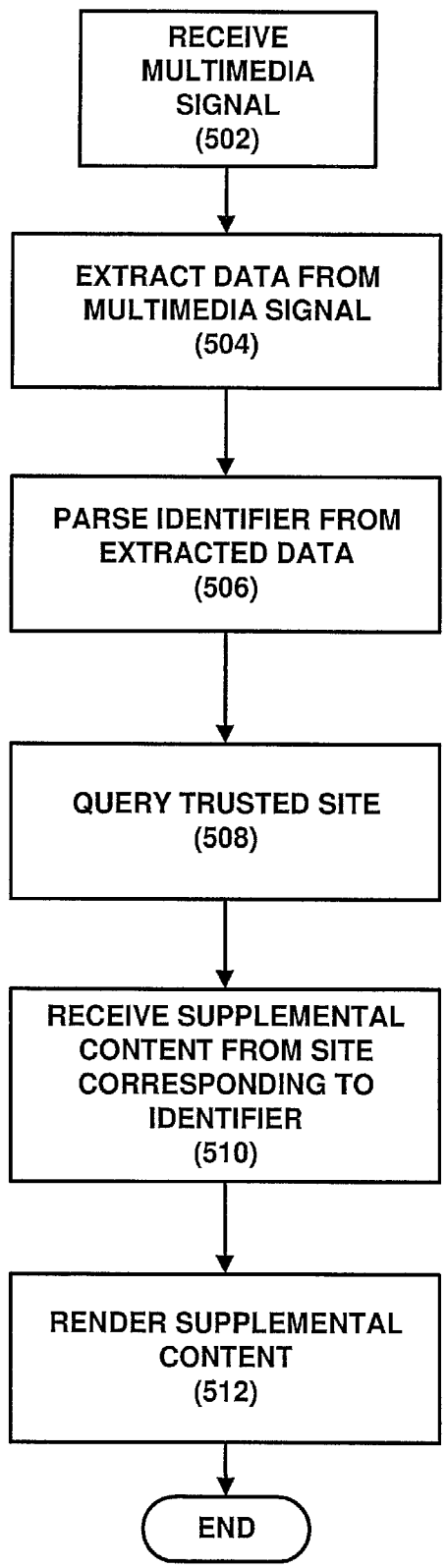
FIG. 5 is a flowchart illustrating an example of a parsing resource identifier information according to one or more techniques of this disclosure.

FIG. 5 is a flowchart illustrating an example of retrieving supplemental content from a resource according to one or more techniques of this disclosure. It should be noted that although FIG. 5 is described with respect to receiver device 300, the techniques described with respect to FIG. 5 may be performed by any combination of components described herein. As illustrated in FIG. 5, receiver device 300 receives a multimedia signal (502). In one example, a multimedia signal may include a signal received through a multimedia interface. Receiver device 300 extracts data from the received multimedia signal (504). In one example, data in the multimedia signal may be embedded according to a specified watermark emission. Receiver device 300 parses a identifier from the extracted data (506). In one example, an identifier may be associated with the address of a resource. For example, a particular broadcast identifier may be associated with the IP address of a server hosting an application. Receiver device 300 may parse data according to one or more of example syntax structures described above. Receiver device 300 queries a trusted site (508). For example, as described above, receiver device may form a URI including the identifier and registration authority site root domain. Receiver device 300 receives supplemental content from the site corresponding to the identifier in response to the query (510). Receiver device 300 renders supplemental content (512). For example, receiver device 300 may cause an application to be displayed. In this manner, receiver device represents an example of a device configured to retrieving supplemental content from a resource.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array signal (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

<Overview>

According to one example of the disclosure, a method for signaling information in a variable length payload of a watermark message comprises determining a number of data fragments required for the information, signaling a syntax element identifying a message block type, and signaling a syntax element indicating the length of the message block payload, wherein the number of bits of the syntax element indicating the length of the message block payload is based on the message block type.

According to another example of the disclosure, a device for signaling information in a variable length payload of a watermark message comprises one or more processors configured to determine a number of data fragments required for the information, signal a syntax element identifying a message block type, and signal a syntax element indicating the length of the message block payload, wherein the number of bits of the syntax element indicating the length of the message block payload is based on the message block type.

According to another example of the disclosure, a non-transitory computer-readable storage medium comprises instructions stored thereon that upon execution cause one or more processors of a device to determine a number of data fragments required for the information, signal a syntax element identifying a message block type, and signal a syntax element indicating the length of the message block payload, wherein the number of bits of the syntax element indicating the length of the message block payload is based on the message block type.

According to another example of the disclosure, an apparatus comprises means for determining a number of data fragments required for the information, means for signaling a syntax element identifying a message block type, and means for signaling a syntax element indicating the length of the message block payload, wherein the number of bits of the syntax element indicating the length of the message block payload is based on the message block type.

The details of one or more examples are set forth in the accompanying drawings and the description below. Other features, objects, and advantages will be apparent from the description and drawings, and from the claims.

The invention claimed is:

1. A method for signaling opaque user data in a payload of a watermark message, the method comprising:

determining a number of data fragments required for the payload;

signaling, based on the number of data fragments required for the payload, a first syntax element identifying a message block type; and signaling a second syntax element indicating a length of the payload, wherein a number of bits of the second syntax element is based on the message block type.

2. The method of claim 1, wherein the number of bits of the second syntax element is 8 for a first message block type and is 14 for a second message block type.

3. The method of claim 2, wherein the first message block type allows a maximum message block payload of 4 fragments.

4. The method of claim 2, wherein the second message block type allows a maximum message block payload of 256 fragments.

* * * * *